US012793531B2

(12) United States Patent
Millican et al.

(10) Patent No.: US 12,793,531 B2
(45) Date of Patent: Nov. 10, 2026

(54) PERSONAL MOBILE SAFETY APPARATUS AND EVIDENCE SECURE METHOD

(71) Applicants: Ruth Nicola Millican, Hong Kong (CN); Brian Pemberton, Hong Kong (HK)

(72) Inventors: Ruth Nicola Millican, Hong Kong (CN); Brian Pemberton, Hong Kong (HK)

( * ) Notice: Subject to any disclaimer, the term of this patent is extended or adjusted under 35 U.S.C. 154(b) by 214 days.

(21) Appl. No.: 18/476,599

(22) Filed: Sep. 28, 2023

(65) Prior Publication Data

US 2024/0029541 A1 Jan. 25, 2024

Related U.S. Application Data

(63) Continuation-in-part of application No. 17/430,501, filed as application No. PCT/CN2020/075241 on Feb. 14, 2020, now Pat. No. 12,165,482.

(51) Int. Cl.

| | |
|---|---|
| ***G08B 25/01*** | (2006.01) |
| ***G06V 20/52*** | (2022.01) |
| ***G08B 25/10*** | (2006.01) |
| ***G08B 29/18*** | (2006.01) |

(Continued)

(52) U.S. Cl.
CPC ........... *G08B 25/016* (2013.01); *G06V 20/52* (2022.01); *G08B 25/10* (2013.01); *G08B 29/186* (2013.01); *H04W 4/029* (2018.02); *H04W 4/90* (2018.02)

(58) Field of Classification Search
CPC ...... G08B 25/016; G08B 19/00; G08B 25/12; G08B 21/0476; G08B 21/0446; G08B 25/10; G08B 29/186; G08B 29/16; G06V 20/52; G06V 40/10; G06V 40/23;
(Continued)

(56) References Cited

U.S. PATENT DOCUMENTS

| | | | | |
|---|---|---|---|---|
| 2013/0279757 | A1* | 10/2013 | Kephart | G06Q 50/265 382/105 |
| 2016/0080550 | A1* | 3/2016 | Kwon | H04M 1/72421 455/552.1 |
| 2017/0162032 | A1 | 6/2017 | Gellman et al. | |

(Continued)

FOREIGN PATENT DOCUMENTS

WO WO-2017085743 A2 * 5/2017 ......... G08B 21/0211

OTHER PUBLICATIONS

International Search Report and Written Opinion relating the International Patent Application No. PCT/EP2024/077117, mailed Dec. 20, 2024, 13 pages.

*Primary Examiner* — James J Yang

(74) *Attorney, Agent, or Firm* — Invention Matters, LLC; Edwin De Angel

(57) ABSTRACT

There is disclosed an apparatus having a scene monitor to capture the images or videos, storing a first plurality of data most recently obtained over a predetermined length of time to the apparatus. The main controller comprises a transceiver for performing wireless communication and continuously/regularly sends a copy of the first plurality of data to a separate mobile computing device for safe keeping . . . . In the event of attack or an emergency, the transceiver of the personal security apparatus sends the first plurality of data and second plurality of data to mobile computing device and the mobile computing device transfers the first plurality of data and second plurality of data to a secure server.

20 Claims, 7 Drawing Sheets

(51) Int. Cl.
*H04W 4/029* (2018.01)
*H04W 4/90* (2018.01)

(58) Field of Classification Search
CPC ............ H04N 23/6812; H04N 23/661; H04W 4/029; H04W 4/80; H04W 4/90
See application file for complete search history.

(56) References Cited

U.S. PATENT DOCUMENTS

| | | | | |
|---|---|---|---|---|
| 2017/0193306 | A1* | 7/2017 | Robil | H04M 1/72457 |
| 2019/0087662 | A1 | 3/2019 | Zhao et al. | |
| 2019/0187765 | A1 | 6/2019 | Ashwood et al. | |
| 2020/0184968 | A1* | 6/2020 | Han | G06N 20/00 |

* cited by examiner

FIG. 5
Remote Server
Users Phone

PERSONAL MOBILE SAFETY APPARATUS AND EVIDENCE SECURE METHOD

CROSS-REFERENCE TO RELATED APPLICATIONS

This application claims the benefit of being continuous in part application of US application having serial number U.S. Ser. No. 17/430,501 filed, Aug. 12, 2021, which is national phase application of PCT/CN2020/075241 having filing date Feb. 14, 2020, which takes priory of the filing date of HK application having Serial No. HK19119426 titled "Mobile personal-safety apparatus" filed on Feb. 14, 2019 and the subject matter of which is incorporated herein by reference

FIELD OF INVENTION

The present application relates generally to a personal safety apparatus and method, and more specifically to a system for enhancing personal safety through wireless communication and data processing.

BACKGROUND ART

The following description includes information that may be useful in understanding the present invention. It is not an admission that any of the information provided herein is prior art or relevant to the presently claimed invention, or that any publication specifically or implicitly referenced is prior art.

When a person is working, studying, commuting, taking public transport, using taxi, enjoying sports or other general activities in open spaces such as streets, roads or the countryside, the person comes into contact with the general public. There are occasions that the person is likely to be attacked, harassed and generally made to feel unsafe in his or her environment by other people, or to be subject to accidents or emergencies. It is desirable to have a system or a device enabling the person to feel safer in such adverse circumstances.

U.S. Pat. No. 9,177,455B2 discloses a personal safety system having an electronic device for capturing images and audios of an environment nearby a user, and a smartphone for receiving the captured data from the electronic device and relaying the data to a secure and remote storage location. The electronic device is wearable by the user. The stored data can be used in the future as, for instance, evidence of an attacker attacking the user even if the electronic device is subsequently destroyed by the attacker. However, the smartphone can be removed and destroyed by the attacker. Furthermore, the user is required to switch on the electronic device when the user is being attacked or feels that he or she is likely to be attacked. One shortcoming is that the user may not be able to switch on the electronic device, especially when he or she is under attack. For example, the person has their hands pinned by an attacker. It is desirable if there is an automatic switching-on mechanism for the electronic device. Another shortcoming is that a pre-recording of the scene prior to the attack is not possible unless he or she is aware of the forthcoming danger. The scene prior to the attack may be valuable evidence to the police in investigating the attack. It is also desirable if recording of the scene prior to the attack is possible.

US patent application US20190066478 discloses a system, apparatus and methods for facilitating personal safety monitoring via an apparatus with multiple sensors are disclosed. The sensors may include a number of biometric sensors including a body temperature sensor, a pulse rate sensor and a blood oxygen sensor and/or any other sensors. The apparatus may be configured to generate various alerts in response to combinations of signals generated by the sensors. For example, the apparatus may generate a variety of biometric stress alerts corresponding to different multi-dimensional biometric stress signatures associated with the multiple biometric sensors. The alerts generated by the apparatus may be transmitted to a server or a client device associated with the apparatus for further processing, which may include generating a notification for presentation on the client device in response to an alert being received from the apparatus.

US patent application US20170193306A1A wearable camera activated security accessory including a motion sensor activated camera. The motion sensor is activated when motion takes place proximal to the wearer of the accessory. As a result, a camera is activated in response to the activation of the motion sensor. Facial information of a person causing the activation of the motion sensor is then acquired and recorded. Facial information is acquired using facial recognition techniques. Acquired facial information is then sent to a remote server that is accessible by both a mobile phone application and/or authorities.

U.S. Pat. No. 6,784,833B1 discloses a personal surveillance system wearable by a user but image recording made by the system is triggered by a remote party, not automatically.

U.S. Pat. No. 5,594,498A discloses a personal audio/video surveillance system triggered to record images and audios by the user, also not automatically, although the recorded images and audios are instantly transmitted to a remote location.

US Patent Application 2015/0316979A1 discloses a wearable camera system in which image recording is also manually triggered by the user.

JP Patent Application JP2006285749A discloses a schoolbag installed with a camera for continuously taking photographs of a student's surrounding and transmitting the photographs remotely to the student's parents through a mobile communication network. In case of an attack happening to the student, the photographs before the attack are available at the expense of large battery-power consumption and cost with regards to data charges etc., spent in continuously transmitting the video to a remote location. There is also the question of what you do with all the data captured, when the majority of the data is of no use. Automatic triggering of image recording in case of danger is useful for battery power saving.

There is a need in the art for a personal safety system or apparatus having at least the functionality of detecting a threat to a user, and hence automatically sensing an ambient environment of the user.

It is also preferable if the system or apparatus has an additional functionality of recording the ambient environment in the device itself before the threat is detected without putting a heavy burden on the required battery power and the network.

It would also be preferable to not only have a pre-recording to provide context, but to also have a copy of that data in the event that if the device described is damaged or destroyed, the data will be available on the person mobile computing device (Smartphone/Smartwatch).

Problem Statement

This application addresses the problem of securely storing the first plurality of data and second plurality of scene data in the event of an attack or accident.

If a person were to use a body worn device, the danger is that an attacker might be able to remove that device from the person and destroy the device before the scene data is successfully uploaded to a secure server.

A US application having serial number US17/430,50 solves this problem by splitting the device into 2 pieces, allowing the transmission and memory elements to be hidden under clothing or in a bag. Thus, providing valuable additional time for the device to transmit the scene data to the remote server. However, there is still the risk that an attacker may be able to remove the device before enough data is transmitted to the remote server to incriminate him.

Also, as technology improves, a smaller, lightweight single piece design becomes more of a reality. Being more convenient to wear than a two-piece device, but still having the problem of protecting the scene data when attacked as a single piece design can be more easily removed and destroyed by an attacker.

In order to save battery power and size, the device (whether it is a 2 piece or 1 piece design) uses a mobile computing device for example a cellular connected Smartphone or Smartwatch or a wired or wireless connected tablet/laptop to transmit the scene data to a remote server in an emergency.

Therefore, it is advantageous if a copy of the data existed locally at all times, one copy in the local memory of the personal protection device and a second copy held in the memory of the connected mobile computing device which would be at the scene of the emergency. This offers advantages over the prior art.

In the event, an attacker destroys the scene monitoring device (body worn camera) a second copy of the scene data is available on the mobile computing device and vice versa. Two copies of the data exist locally.

In the event of an emergency, the first plurality of data is immediately available to the mobile computing device (as a copy already exists in its own memory) to upload to the remote secure server as fast as possible.

Some other methods/art could simply continuously send data to a secure server, but there are several disadvantages to this approach:

- This requires a wireless or cellular connection to do so—Locations are not always able to guarantee consistent data transmission.
- Recording at all times and transmitting to the cloud means that the user must store large amounts of data and decide at a later date what to do with it.
- Transmitting permanently to the cloud is also expensive in terms of data charges with the cellular operators.
- Transmitting permanently to the cloud also requires greater battery resources to communicate with the wireless network as a person moves for example from one cell site to another.

Therefore, having a copy of that data made local to the user and in a loop, recording overcomes many of problems listed above.

SUMMARY

The summary of the invention does not necessarily disclose all the features essential for defining the invention. The invention may reside in a sub-combination of the disclosed features. The various combinations and sub-combination are fully described in the detailed description.

The application provides a system and method for processing and storing scene data obtained by an apparatus. The apparatus includes a main controller and scene monitor combined in a single apparatus, which receives scene data and stores a first plurality of data most recently obtained over a predetermined length of time and stores it in the personal security apparatus local memory as well as in the memory of the user's mobile computing device. The main controller includes a transceiver for wireless communication, which is configured to continuously transmit the first plurality of data to a separate mobile computing device located in the vicinity or user's mobile computing device such as Smartphone or smartwatch which more often than not is located on their person for safekeeping. Hence, 2 copies of the first plurality of data are always in existence local to the user.

In the event of an emergency condition, the processor configures the transceiver to transmit a second plurality of scene data obtained after the emergency condition is detected. This second plurality of data is sent to the remote server via the user's mobile phone, smartwatch or some other form of mobile computing device. Securely storing the data in a remote server for future use.

At the same time a copy is also stored in the memory of the apparatus and the user's mobile computing device, even if the apparatus is subsequently tampered with or damaged. Once secured in the remote server, the mobile computing device and or the personal safety apparatus can remove their copy of the data if required. This would be done manually or automatically via a mobile app or some other user-friendly interface and the like and would be at the user's discretion.

There is disclosed a processing the scene data received therefrom, storing a first plurality of data most recently obtained over a predetermined length of time. Wherein the main controller comprises a transceiver for performing wireless or cellular communication and continuously/regularly sends a copy of the first plurality of data to a separate mobile computing device local to the emergency as a backup and for safe keeping.

First plurality of scene data provides context to the emergency/incidents. The first plurality of scene data is crucial and important to let the authorities or law understand the context leading to emergency or critical situations. Thus, the need to protect it is paramount for a court case.

In another embodiment, the personal security apparatus may or may not store the first and second plurality of data. Different variants of the personal security apparatus having different internal memory for storing first and second plurality of data.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

The present disclosure is illustrated by way of example and not limited to the accompanying figures in which reference numerals indicate similar elements. Embodiments of the application will now be described with reference to the attached drawings:

Figure 1:
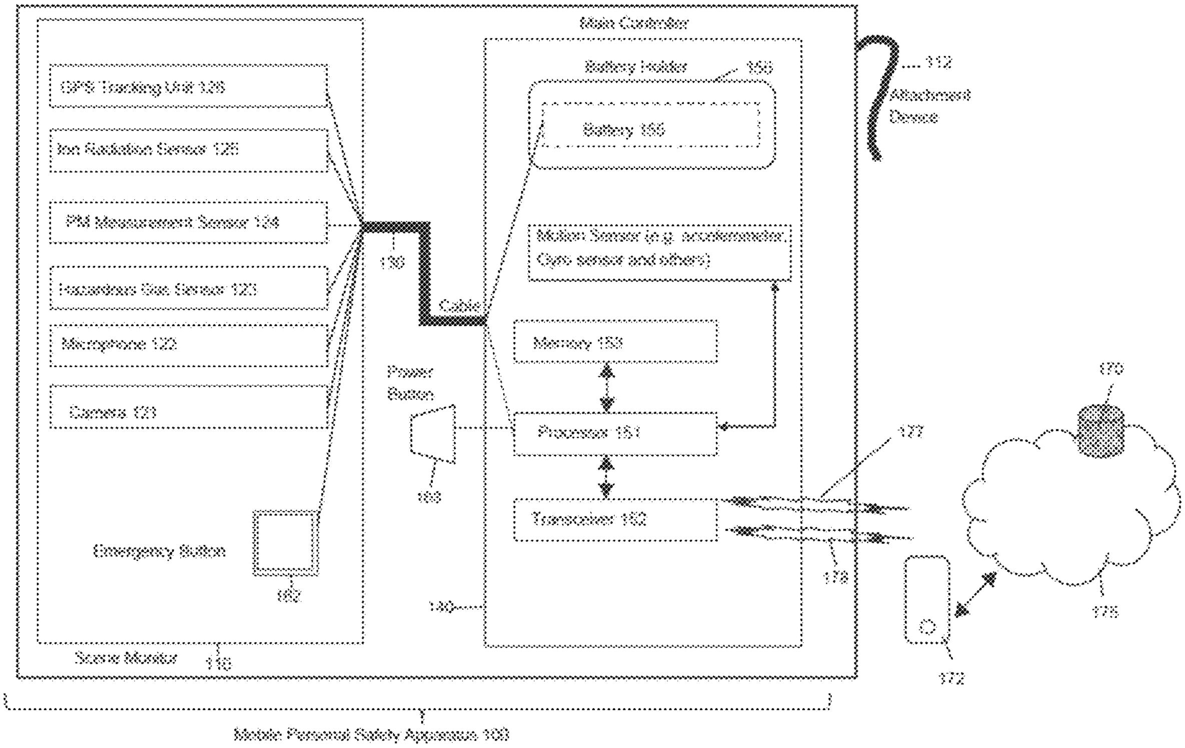

The diagrams are for illustration only, which thus is not a limitation of the present disclosure, and wherein:

FIG. 1 illustrates an exemplary personal mobile safety apparatus, in accordance with one of the embodiments of the present invention.

Figure 2:
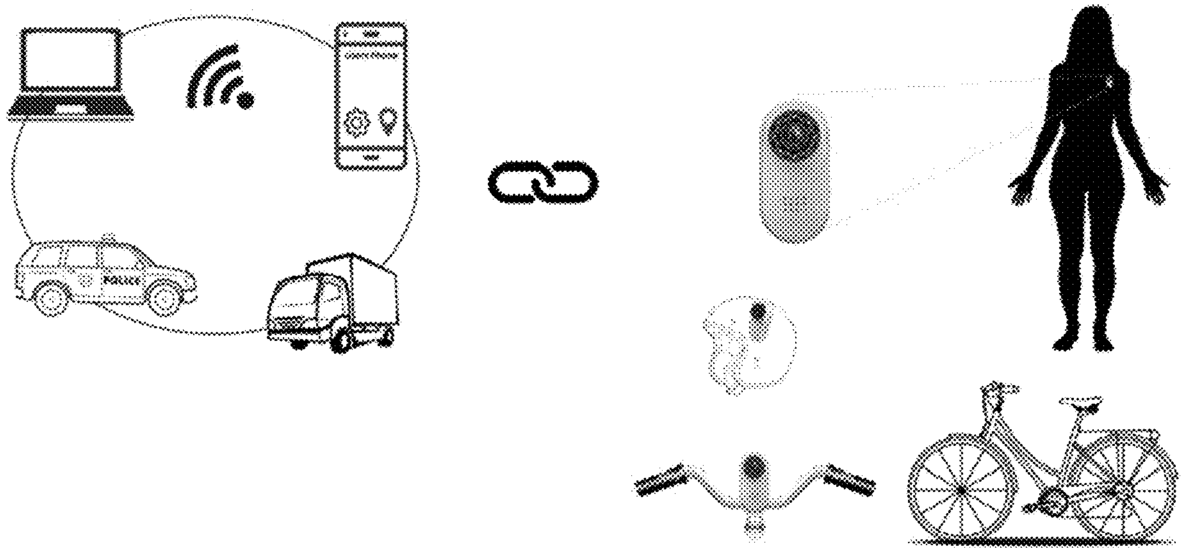

FIG. 2 illustrates the personal safety apparatus having a permanent wireless connection to a mobile computing device, in accordance with one of the embodiments of the present invention.

Figure 3:
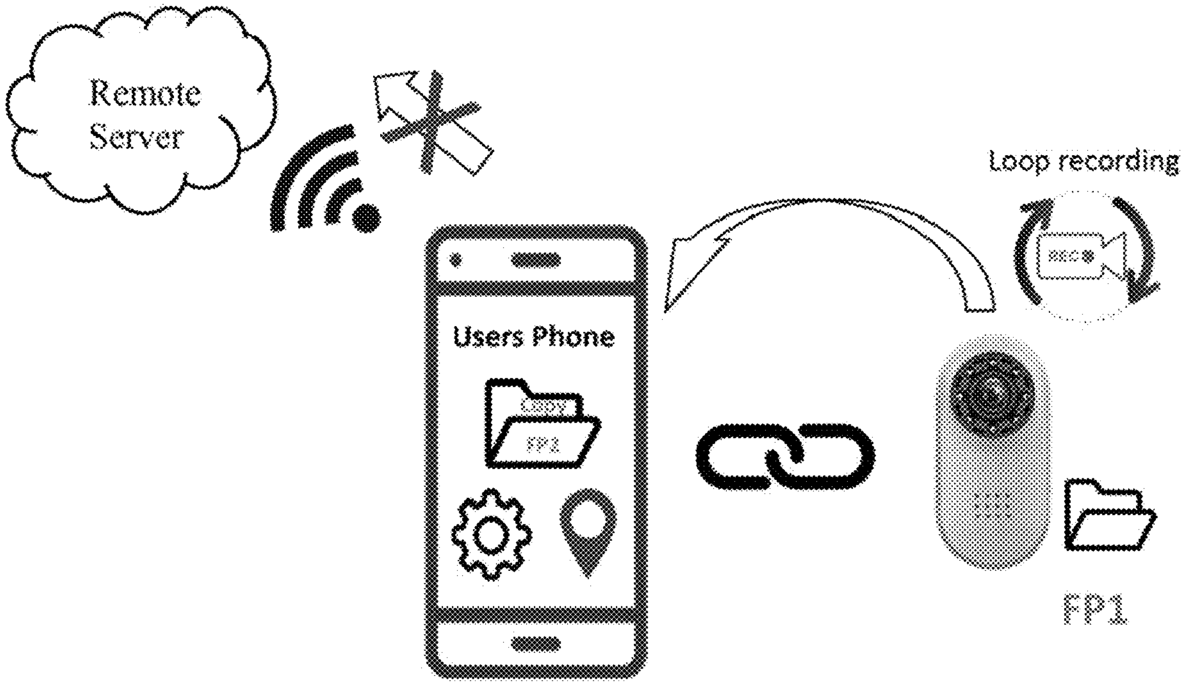

FIG. 3. illustrates the personal safety apparatus recording in a pre-determined loop and transmitting a copy to a mobile computing device, in accordance with one of the embodiments of the present invention.

Figure 4:
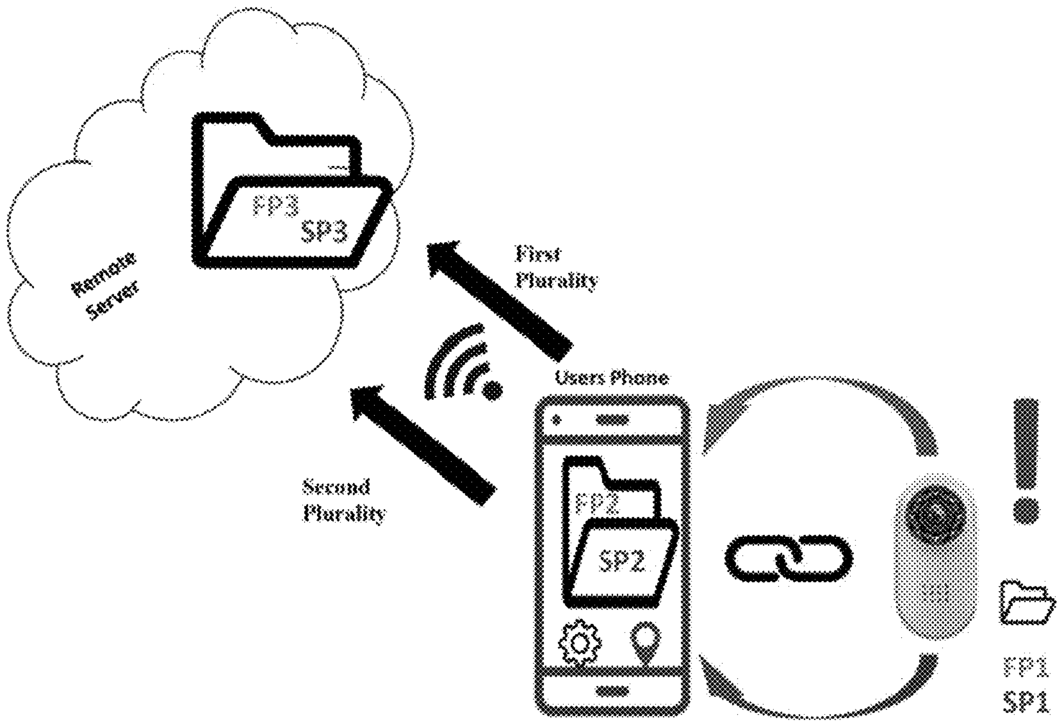

FIG. 4. illustrates the mobile computing device in an emergency condition sending the first and second pluralities of data to the secure server, in accordance with one of the embodiments of the present invention.

Figure 5:

FIG. 5. Illustrates the personal safety apparatus with the mobile computing device and a cloud server, in accordance with one of the embodiments of the present invention.

Figure 6:
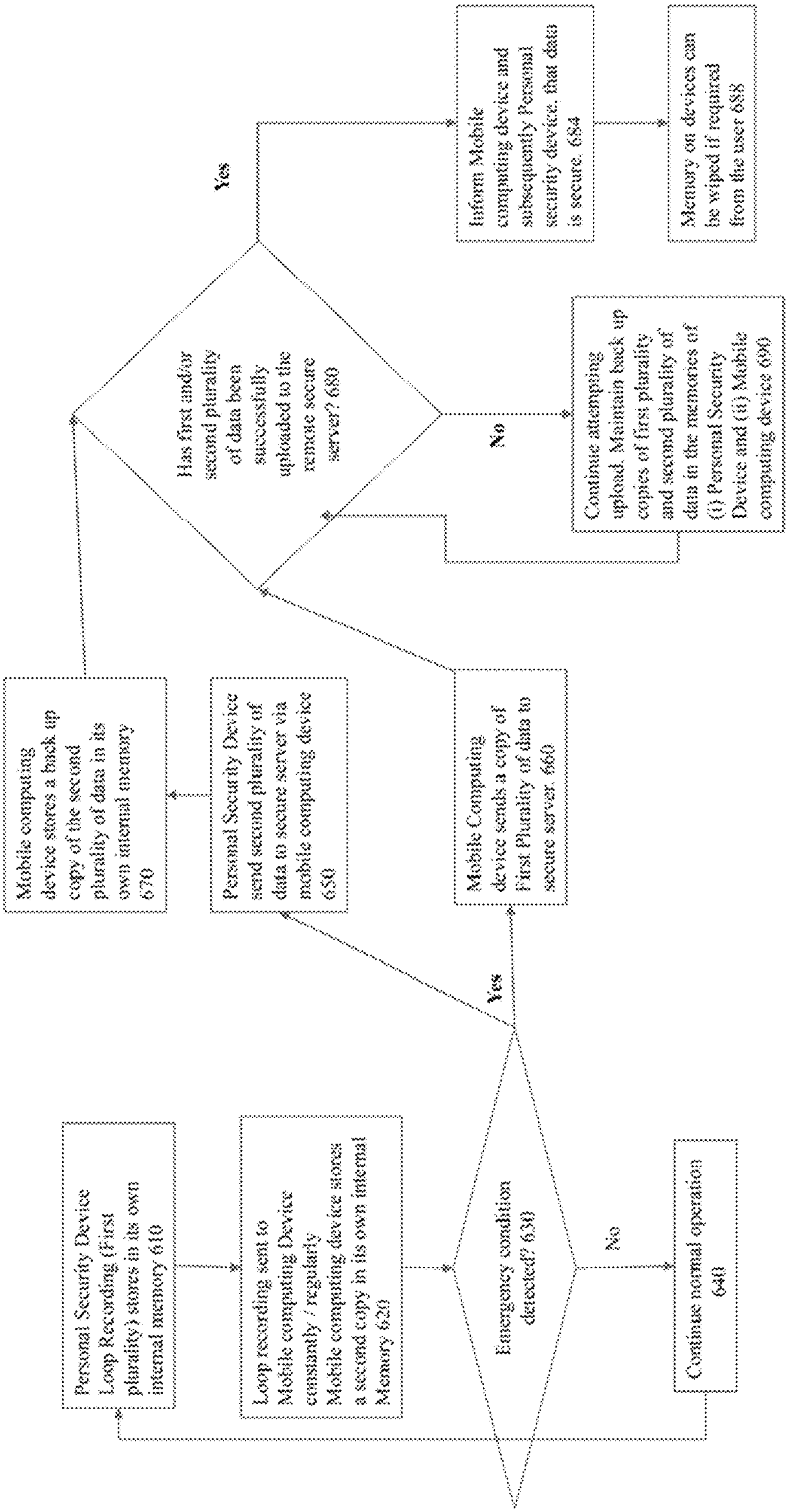

FIG. 6. Illustrates a flow chart for the method of communication first and second plurality of data, in accordance with one of the embodiments of the present invention.

Figure 7:
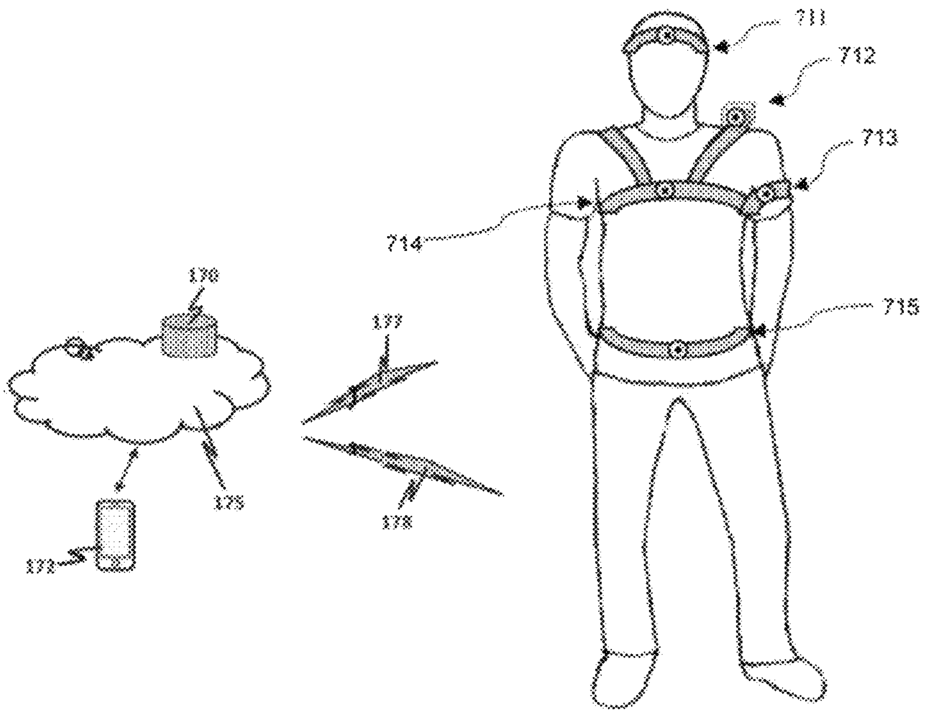

FIG. 7 illustrates the example locations on a user's body suitable for positioning the personal safely apparatus, in accordance with one of the embodiments of the present invention.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

It should be understood that in this application, "at least one (item)" refers to one or more and "a plurality of" refers to two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

The apparatus comprises a scene monitor and main controller, configured to be low power processing unit allowing for the potential of a single piece design, although a two or more-piece design could also use this approach to protecting the data.

FIG. 1 depicts an exemplary personal mobile safety apparatus, in accordance with one of the embodiments of the present invention. The personal mobile safety apparatus includes a scene monitor for sensing an ambient environment of a user, and a main controller for controlling the scene monitor and processing scene data received therefrom, a battery and a transceiver, sensors such as GPS Imaging sensor, km radiation sensor. PM measurement sensor, Gas sensor, microphone and motion sensors such as gyroscope and accelerometer, processing unit and memory. The device might be in a single piece design or split into two or more pieces.

The application provides a system and method for processing and storing scene data obtained by an apparatus. The apparatus includes a main controller and scene monitor, that receives scene data and stores a first plurality of data most recently obtained over a predetermined length of time to the device's local memory as well as simultaneously (or as close to simultaneously as the technology will allow) transmitting a copy of the first plurality of data to the local memory of the user's mobile computing device. The personal security apparatus memory is used for storing the computer readable instructions and other executable modules for operating the apparatus.

The main controller also includes a transceiver for wireless communication, which is configured to continuously transmit the first plurality of data to a separate mobile computing device or user's mobile computing device located local to the user for safekeeping. Local device being within the same vicinity of the user, within wireless communication range and not remote, e.g., in another city or country. Therefore, having two copies of the first plurality of data at any one time local to the emergency/event. In the event of an emergency condition, the processor configures the transceiver to immediately transmit a second plurality of scene data obtained after the emergency condition is detected. This second plurality of data is securely stored in a remote server for future use, and a copy is also simultaneously (or as close to simultaneously as the technology will allow) stored in the memory of the user's mobile computing device and the apparatus, even if the apparatus is subsequently tampered with or damaged. Hence there being multiple copies of the first and second plurality of data.

There is disclosed a processing the scene data received therefrom, storing a first plurality of data most recently obtained over a predetermined length of time. Wherein the main controller comprises a transceiver for performing wireless or cellular communication and continuously/regularly sends a copy of the first plurality of data to a separate mobile computing device local to the user for safe keeping.

The importance of the first plurality of scene data and second plurality of scene data, where the first plurality of data is before the emergency situation and second plurality of data is after the emergency situation is identified. The first plurality of scene data provides context to the situation, where the second plurality of the scene data describes the emergency situations.

A context is important as women (victims are primarily women, although it could be a man) who accuse a person of some form of sexual attack in court need to provide evidence not only of what happened, but also that they were not a willing party. This often comes down to a matter of one person's word against another's. Which is why so few cases are brought to court and even fewer convictions exist.

The context to the emergency situation adds value in understanding the situation, which led to the emergency situation. Further the first plurality of scene data also provides information leading to the emergency situations and also sheds light, that who is responsible for the emergency situation or what happened and more importantly, how it happened. It will be helpful in providing evidence in the court of law while proving innocence.

In a commercial embodiment of the invention a lone worker may be inspecting a site, therefore video, audio and potentially other sensor data recorded prior to an accident may bring valuable insight into what happened to the worker and the circumstances for the accident.

Embodiments of the invention are associated with various advantages and/or technical effects.

By continuously sending a copy of the first plurality of data to a user's mobile device or a separate mobile computing device local to the user, the system ensures that a copy of the most recently obtained scene data is securely stored in the event of an attack or accident. This provides a reliable backup of the data, reducing the risk of loss or corruption of data, in the event of an attacker being able to damage either the apparatus or the local mobile computing device.

In the event of an emergency condition, the apparatus is configured to transmit a second plurality of scene data obtained after the emergency condition is detected to a secure remote server via the user's local mobile computing device's connection to the internet. This ensures that crucial scene data is securely stored in a remote server for future use.

Should the personal security apparatus be damaged, the user's mobile computing device would be able to continue recording and transmitting whatever data is available to it through its own sensors. For example, a smartphone camera, microphone and the like. While the mobile computing device is not optimized for such tasks, it could still in an emergency offer some data that could be useful for a future investigation.

A back-up copy is also stored on the user's mobile computing device at the same time, even if the apparatus is subsequently tampered with or damaged. This feature enhances the reliability and availability of the data for analysis and investigation purposes. If for some reason a wireless connection to the internet is not available (for example, in a basement or remote location) at the time to the mobile computing device, then a copy exists on the mobile computing device which can be transferred to the secure server as soon as connection to the internet is restored. It is intended that the personal security apparatus could also have its own copy of the second plurality of data. Thus, there being multiple copies of the data locally at the scene of the emergency.

The personal security device/apparatus would need to be worn on the outside of clothing, or at least visible for the camera and other sensors to be able to record the scene data. An attacker could therefore in theory wrestle the device from the user relatively easily and destroy or damage it in such a way as to not allow the device enough time to upload the first or second plurality of data to the secure remote server as described in the US patent U.S. Ser. No. 17/430,501.

Therefore, it would be advantageous if the first and second plurality of data could be protected without the need to transmit that data to the cloud or secure server. Transmitting to the cloud being both battery intensive and also consuming a lot of data from the user's data plan. Alternatively, if the user is in a location where a cellular connection is not available, by having the scene data saved on both the personal security apparatus and the person's mobile computing device would be advantageous as an attacker would need to remove both devices to destroy the data/evidence of their involvement.

The personal security apparatus is configured and connected to a mobile computing device (for example smartphone/smartwatch/laptop/table and the like). Therefore, by using the mobile computing device's wireless connection such as but not limited to Wi-Fi, hotspot, Bluetooth, LTE or some other form of wireless data transfer, the apparatus is configured to transmit a copy of the first plurality of data from the personal security apparatus to the mobile computing device as a backup. This way 2 copies of the data are kept at any one time locally to the incident and the aggressor would need to destroy both the wearable device and the mobile computing device (smartphone/smartwatch/laptop/tablet and the like) in order to destroy evidence of the attack.

Only when an emergency is initiated, will there be the need to push the data up to the secure server and consume mobile data charges else the first plurality of data will only be held locally within the memory of the apparatus and backed up locally to the memory of the mobile computing device.

By having a copy of the data already on the mobile computing device, in the event of an emergency being triggered, the speed of getting the evidence up to a secure location in the cloud/remote server or to the authorities would also be increased as the first plurality of data is already available on the mobile computing device, which in turn is transmitting the data to the remote secure server.

Further to that approach of having multiple copies of the data locally to the user/"scene of the crime", in the event of an emergency condition being recognized a second plurality of data would also be created by the wearable device/personal security apparatus and then sent to the secure server via the mobile computing devices connection to the internet. Again, when an emergency is recognized, the mobile computing device can not only enable the transfer of the second plurality of data to the secure server through its internet connection, but also maintain a copy of that data in case of something going wrong, or lack of wireless connection due to location or other external factors. The mobile computing device would also be in a position to use its own scene monitors to record the emergency. GPS location data, Cell tower information, locate Bluetooth enabled devices or Wi-Fi signals or microphone recording are examples.

That way, the wearable device and the mobile computing device would have a copy of the 1st and 2nd pluralities of data. Essentially offering the user a backup scenario if one or the other device is damaged by the attacker and also providing time to secure the data to the remote secure server before both the physical devices are damaged and tampered with.

Once successfully uploaded to the secure server, it would be possible to inform the mobile computing device that the data is securely stored, and the mobile computing device can free up its memory if required. The mobile computing device may then also inform the wearable device that the data is secure, and it could clear its memory if required. This would be at the user's discretion and done via an app appearing on the mobile computing device, the memory space of the mobile computing device, or personal security apparatus is recycled.

While the most common use of such an approach is anticipated to be the mobile computing device being a Smartphone, other possible scenarios exist including a nearby police or patrol vehicle using vehicle-to-vehicle (v2v) communication. Whereby the first plurality of data could be transmitted to the vehicle via a device worn by the officer on a continuous basis. This would be for safekeeping in case something happens to the officer and provide context to the incident. The majority of the time no incident or emergency takes place, so the data would be in a loop and not saved any longer than a pre-determined period of time and be of no use or importance. Only once an emergency or incident was taking place would there be a need for the vehicle/mobile computing device to send any pre-recorded scene data and continuing scene data to a separate remote server.

Further, a notification or an alert can also be provided to the authorities or nearby police vehicles.

Similar scenario can include first responder, ambulance or fire department for notification of the emergency situation and also option to save the image, audio, scene monitor data (gas reading, radiation reading, air quality, temperature or other ambient elements at the scene) or video data received from the personal security apparatus.

Bouncers in a bar, or security guards at a Sports venue—A laptop with ethernet connection could be connected to Security staff personal security apparatus/body camera and recording a copy locally on the laptop or via Wi-Fi_(33) to a local computer. Sending the data to a remote server only when an emergency or incident occurs.

Food delivery drivers on a scooter, having a backup of scene data on their mobile phone or other device in case of an accident and the personal security apparatus/body camera fitted most likely in a prone location such as a helmet, which could easily be damaged in the event of an accident. This would provide a backup of the scene data (video recording) prior to the accident.

Cyclists and or Motorcycle riders involved in an accident would benefit from having a copy of the scene data secured on their mobile phone, smartwatch or other mobile computing device (cycle computer for example), again due to the reason of a collision potentially destroying the personal security apparatus (which on this occasion might be attached to a helmet or the handlebars or some other fixed location on the bicycle or motorcycle/scooter). Therefore, a copy would exist and could be transmitted to a secure server for authorities, friends and family to view what happened and the circumstances of what happened.

Parcel delivery workers being another example where the delivery vehicle itself or a mobile computing device stored or incorporated into the vehicle could be constantly receiving a copy of scene data in a pre-determined loop, this might also provide evidence of a parcel or food package being delivered. Therefore, combined with the "Remember Mode" of the device a permanent record of the delivery could be made and transferred to a remote server for the company's evidence that they have successfully made a delivery to a said location at a certain time.

A nurse at a hospital dealing with the general public, the wearable device/apparatus being connected to a locally based computing device via the hospital Wi-Fi network.

The processor in the apparatus provides the advantage of being protective by continuously sending a copy of the first plurality of data to a separate mobile computing device. This ensures that a backup of the data is maintained in the event of an attack or accident, further enhancing the safety and protection of the data Further increasing the chances that the person(s) perpetrating a crime or incident will be recorded, that recording being seen by others and as a result held responsible for their actions.

The processor in the apparatus provides the advantage of mobility by configuring the transceiver to transmit the second plurality of scene data via the mobile computing device. This allows for the data to be securely stored in a remote server and a copy to be stored in the memory of the mobile computing device, even if the apparatus is subsequently tampered with or damaged. This is done only when an emergency condition is initiated, thus saving power for the majority of the time the device is in use and operating under normal safe conditions.

The processor in the apparatus provides the advantage of monitoring by detecting the occurrence of an emergency condition and transmitting the second plurality of scene data obtained after the emergency condition is detected. This ensures that the most recent data is captured and stored for future uses.

The processor in the apparatus provides the advantage of safety by securely storing the second plurality of scene data in a remote server. This ensures that the data is protected and can be accessed for future uses, even if the apparatus is tampered or damaged.

The processor provides the advantage of verifiability by storing a first plurality of data most recently obtained over a predetermined length of time. This allows for easy verification and reference of the data, ensuring its accuracy and reliability.

In an embodiment, the processor is further configured to: responsive to detecting occurrence of the emergency condition, configure the transceiver to transmit via the mobile computing device a second plurality of scene data obtained after the emergency condition is detected for securely storing the second plurality of scene data in the remote server for future uses and a copy of the data in the memory of the mobile computing device even if the apparatus is subsequently tampered or damaged.

The system includes a processor that is capable of processing the scene data received from the apparatus. This allows for real-time analysis and interpretation of the data, enabling prompt decision-making and response to emergency situations.

The apparatus further includes a memory in the mobile computing device for storing a copy of the first plurality of data. This provides an additional layer of data redundancy, ensuring that the most recent scene data is securely stored and readily accessible for analysis, even if the main apparatus is compromised or damaged. This feature enhances the overall reliability and resilience of the system.

FIG. 1 further illustrates an exemplary personal mobile safety apparatus, in accordance with one of the embodiments of the present invention. which has a scene monitor for sensing an ambient environment of a user, and a main controller for controlling the scene monitor and processing scene data received therefrom. There is also memory in the device to store a copy of the data within the device itself. This device may be a single piece design or multiple piece design.

The apparatus includes a processor (151) to execute computer readable instructions stored in the memory (153) of the mobile personal safety apparatus, a scene monitor (110) for sensing an ambient environment of the user to yield scene data); and a main controller (140) for controlling the scene monitor (110) and processing the scene data received therefrom.

The apparatus storing a first plurality of data most recently obtained over a predetermined length of time to the apparatus's memory and transmitting that same to a mobile computing device (172) to provide a second copy of said data.

The main controller (140) further comprises a transceiver (152) for performing wireless communication (177, 178) and continuously/regularly sends a copy of the first plurality of data to a separate mobile computing device (172), in the event of an attack or accident.

The processor (151) is configured to detect the occurrence of an emergency condition adverse to the user and responsive to detecting the occurrence of an emergency condition, configure the transceiver (152) to inform the mobile computing device (172) of the emergency, the mobile computing device (172) then in turn transmits its copy of the first plurality of data to a remote secure server (175) having a database (170) for future use even if the personal safety apparatus (100) or the mobile computing device (172) is subsequently tampered or damaged The processor (151) is further configured to: responsive to detecting occurrence of the emergency condition, configure the transceiver (151) to transmit via the mobile computing device (172) a second plurality of scene data obtained after the emergency condition is detected for securely storing the second plurality of scene data in the remote server for future uses and a copy of the data in the memory of the mobile computing device (172) even if the apparatus is subsequently tampered or damaged.

The separate mobile computing device (172) local to the user configured to be a smartphone, a smartwatch, a tablet, a laptop or a vehicle such as a police vehicle, firetruck, delivery van, commercial vehicle, private vehicle or an ambulance and the like. for safe keeping in the event.

The scene monitor (110) comprises a camera (121) for capturing images and/or video of the ambient environment, the scene data including the captured images or videos.

The personal safety apparatus includes the artificial intelligence module to pre-determine the type of emergencies, on detection of new emergency situation, the processor self-learn, train and update the pre-defined list of emergencies.

The system is now evolving with the detection of new emergency situations and the same are added to the list of pre-defined emergencies situations.

The processor is further configured to process the captured images to determine whether a predetermined object/person is present in the ambient environment in order to detect occurrence of the emergency condition; and responsive to detecting presence of the predetermined hazardous object/person, identify that the emergency condition has occurred, thereby causing the mobile computing device to start transmission of the first plurality of scene data and second plurality of scene data to the remote server to be automatically initiated without a need for the user to initiate the transmission.

The scene monitor (110) comprises a microphone (122) for capturing audio signals originated from the ambient environment, the scene data including the captured audio signals and further process the captured audio signals to determine whether a predetermined danger-indicative sound segment is present in the ambient environment in order to detect occurrence of the emergency condition; and responsive to detecting presence of the predetermined danger-indicative sound segment, identify that the emergency condition has occurred, thereby causing the mobile computing device to start transmission of the first plurality of scene data and second transmission of scene data to the remote server to be automatically initiated without a need for the user to initiate the transmission.

The scene monitor (110) further comprises a GPS tracking unit (126), Ion rad sensor (125), PM measurement sensor (124), Hazardous gas sensor (123) and an emergency button (162).

The scene monitor and main controller are embedded on a single chip or connected through a cable (130) or wire on the pub or externally, when the apparatus is in two-part design.

The separate mobile computing device may be trusted device connected to the user's electronic computing device or the apparatus using Wi-Fi or one or more terrestrial mobile communication protocols or LTE or Bluetooth Low Energy (BLE) or connection via hotspot for in providing wireless connectivity.

The scene monitors or the main controller or the separate mobile computing device comprises a Global Position System (126) tracking unit for identifying a location of the apparatus or the separate mobile computing device to yield location data and to transmit the location information to the remote server.

The main controller or the separate mobile computing device further includes a power button or on-screen power button for enabling the user to manually switch on and off the apparatus or connection between the mobile device and apparatus to enter into power saving mode; and the processor is further configured to: responsive to detecting occurrence of the emergency condition, temporarily inactivate the power button to disable switching off the apparatus at least until the processor receives a message from the remote server that the remote server has successfully received the first and second plurality of scene data, thereby hindering an attacker who attacks the user from forcibly stopping transmission of the first-plurality of scene data to the remote server.

The apparatus further comprises a battery holder for accommodating a battery; and a cable to allow charging or reverse charging the apparatus and the mobile electric device.

The mobile computing device can control the movement of the camera connected to the apparatus to capture any third-party incidents.

The processor of the apparatus is configured to identify the emergency situation before image processing on the faces of the nearby persons and checking them with a database of known criminals or terrorists; on identification, a notification or alert is sent to the remote server and to the police authorities with the location of identification.

The invention can take form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, propagate, or transport the program for use by or in connection with the instruction execution system, apparatus, or device.

The following definitions are used herein in the specification and the appended. claims. “A cloud” or “computing cloud” is interpreted in the sense of cloud computing or, synonymously, distributed computing over a network unless otherwise specified. “A server” is interpreted in the sense of computing. That is, a server is a computing server. A server is usually equipped with one or more (computing) processors for executing program instructions, and one or more storages for storing data. A server may be a standalone computing server (Le a. physical server), a distributed server in the cloud, or a virtual server for handling clients' instructions. The one or more storages may be, for example, hard disks or solid-state disk drives. “A mobile computing device” is a portable electronic device having computing power and configured to be used by a human user. For e, ample, a mobile computing device may be a smartphone or a handheld tablet computer.

A mobile personal-safety apparatus configured to sense an ambient environment of a user to generate scene data, to detect occurrence of an emergency condition adverse to the user, and to automatically send the scene data immediately obtained before the emergency condition to a remote server for safe-keeping. For illustrating the disclosed apparatus, FIG. 1 depicts an exemplary personal mobile-safety apparatus 100.

The apparatus 100 is wearable by the user, and comprises a scene monitor 110 and a main controller 140. The scene monitor 110 is used for sensing an ambient environment of the user to yield scene data. The main controller 140 is used for controlling the scene monitor 110 and processing the scene data received from the scene monitor 110. The main controller 140 comprises a transceiver 152 and a processor 151. The transceiver 152 is used for performing wireless communication between the personal security apparatus 100 and elsewhere external to the apparatus 100. In particular, the transceiver is simultaneously sending a copy of the scene data most recently recorded (first plurality of data) to a connected Mobile Computing device in order to keep a copy of that scene data separate to the personal security apparatus. The transceiver 152 is controllable by the processor 151. in particular, the processor 151 is configured to (1) detect occurrence of an emergency condition adverse to the user, and (2) upon detection of occurrence of the emergency condition, configure the transceiver 152 to inform the mobile computing device to transmit its copy of the first plurality of scene data most-recently obtained over a predetermined length of time to a secure server and a second plurality of data to remote server via the mobile computing device, while storing a copy of the second plurality of data in the internal memory of the mobile computing device. Thus, securely storing the first and second plurality of scene data in the remote server 170 and a copy of the first and second plurality of data in the memory of the Mobile computing device for future uses even if the apparatus 100 or mobile computing device is subsequently tampered or damaged, e.g., by an attacker who attacks the user.

The first plurality of scene data contains the scene data recorded immediately, before the emergency condition occurs, and thus provides evidential information about pre-occurrence of the emergency condition. Those skilled in the art may determine the predetermined length of time by considering how much evidential information is required to understand the ambient environment leading to the occurrence of the emergency condition. For example, 30 seconds to five minutes may be sufficient in some practical situations.

Apart from the first plurality of scene data, the scene data obtained after the emergency condition is detected are also important because such scene data record the ambient environment when the user is exposed to a dangerous situation. Preferably and advantageously, processor 151 controls the scene monitor 110 to continue sensing the ambient environment after the emergency condition is detected. In addition, the processor 151 configures the transceiver 152 to transmit a second plurality of scene data obtained after the emergency condition is detected for securely storing the second plurality of scene data in the remote server 170 via the mobile computing device for future uses even if the apparatus 100 is subsequently tampered or damaged. The personal safety apparatus and mobile computing devices also keep a copy of the scene data in their own memory, local to the incident.

The apparatus 110 is equipped with one or more sensors for sensing the ambient environment.

In some embodiments, the scene monitor 110 is installed with a camera 121, or a plurality of cameras, for capturing images of the ambient environment. The scene data therefore include the captured images. Optionally, the processor 151 is configured to determine whether a violent movement signifying the user facing a physical attack or an accident has occurred in order to detect occurrence of the emergency condition. Whether a violent movement has occurred is determined by processing the captured images. If it is determined that a violent movement has occurred, the occurrence of the emergency condition is detected or confirmed. The detection or confirmation of occurrence of the emergency condition causes the apparatus 100 to automatically initiate a transmission of the first plurality of scene data and second plurality of scene data to the remote server 170 using mobile computing device where mobile computing device is also retaining a copy of data locally for safe-keeping without a need for the user to initiate the transmission.

Practically, the violent movement is usually detected by estimating an amount of shake, or a change of speed, made to the camera 121 from successively captured images. The amount of shake and the change of speed can be determined according to the teachings in the art, e.g., the algorithms disclosed in US 2011/0310262A1, U.S. Pat. No. 9,888, 180B2 and U.S. Pat. No. 9,973,698B2. The violent movement is determined if the amount of shaking is excessive, or if the change of speed is large and abrupt. Since the violent movement is a result of the user facing the physical attack or the accident, those skilled in the art may conduct routine experiments to determine the amount of shake and; or the change of speed in determining occurrence of the violent movement. The processor 151 may also detect the violent movement by detecting an abnormal behavior of the user. When there is a struggle between the user and an attacker, the user usually makes a series of movements, such as being pushed, shaken, hit, etc., in a short time. All these movements may be detected as not normal behavior for the user to do, thus identifying occurrence of the emergency condition.

It is observed that before the emergency condition is detected, the personal safety apparatus may not be required to continuously take a video of the ambient environment in order to save battery power of the apparatus 100. In one embodiment it would be possible to periodically capture images of the ambient environment, e.g., taking 4 to 8 snapshots per second, while also collecting audio data and other scene data captured via the scene monitor 110 and storing in the personal security apparatus' memory and the memory of the mobile computing device. In another embodiment video might be captured, but at a reduced rate, for example 10 frames per second prior to an emergency event, while during an emergency event the frame rate could be increased to a higher rate to capture greater detail, for example 30 frames per second or more.

After the emergency condition is detected, it would be advantageous to take a video, or a series of snap shots, to collect more details on the ambient environment. In one embodiment, the processor is further configured to perform the following tasks. In the absence of the emergency condition being detected, the processor 151 controls the camera 121 to periodically capture still images of the ambient environment. In response to detecting occurrence of the emergency condition, the processor 151 controls the camera 121 to take a video, or a further series of snap shots, of the ambient environment in real time. The processor 151 further configures the transceiver 152 to transmit the video or the series of snap shots to the mobile computing device and to a remote server 170 for securely storing the video in the remote server for future uses even if the apparatus 100 is subsequently tampered or damaged. The scene data are stored in a memory 153 of the personal safety apparatus 140. until such a time as it is removed by the user. or the main controller 140 is notified by the remote server 170 or the mobile computing device that the data have been successfully and safely received and stored. This can be controlled via software placed on the mobile computing device and available to the user via the user interface of the mobile computing device, for example a mobile application on a user's smartphone.

The determination of whether the violent movement or a fail by the user (for example if the user is an elderly person) has occurred may be aided by a mechanical device and/or artificial intelligence module and/or plurality of sensors, configured to detect motion of the apparatus 100. Optionally, the apparatus 100 further comprises a motion sensor 160 for detecting motion of the user to yield motion data. Practically, the motion sensor 160 is usually realized as a three-axis accelerometer, a gyroscope, a barometer or other air pressure sensor or a combination thereof. Preferably, the processor 151 is further configured to process the motion data to give a second decision of whether the violent movement has occurred so as to combine with a first decision made by processing the captured images on determining whether the violent movement has occurred. The combining of the first and second decisions to give a final decision of whether the violent movement has occurred may be implemented as follows. In one option, the final decision is made if the processor 151 finds that both the captured images and the motion data indicate occurrence of the violent movement. Using this option reduces the likelihood of a false alarm. In another option, the final decision is made if either the captured images or the motion data indicate occurrence of the violent movement. Using this option reduces the likelihood of missing. It is also possible to develop an algorithm to make the final decision such that the likelihood of miss is minimized under a given likelihood of false alarm.

Alternatively, the processor 151 may process the motion data alone (using an accelerometer and/or gyro and/or barometer) to detect occurrence of the violent movement without processing the captured images for such detection. Since the motion sensor 160 directly outputs the motion data, it is less computationally intensive for the processor 151 to process the motion data in detecting the violent movement in comparison to making the detection through processing the captured images, thus leading to a saving in battery power.

The motion sensor 160 may be located in the main controller 140 of the apparatus (100) as one of the sensors for sensing the ambient environment. As a result, the scene data further includes the motion data.

Apart from detecting occurrence of the emergency condition through identifying the violent movement from the captured images, the emergency condition may also be detected by independently identifying other events. In some embodiments, the processor 151 is configured to process the captured images to determine whether a predetermined hazardous object is present in the ambient environment in order to detect occurrence of the emergency condition. If it is determined that the predetermined hazardous object. is present, occurrence of the emergency condition is detected. It causes the processor 151 to execute a preset procedure, which includes the delivery of the first plurality of scene data to the remote server 170, in response to occurrence of the emergency condition. Examples of hazardous objects include a fire, a certain type of weapon, a pre-determined person known to the user or a known felon, Generally, the detection of the predetermined hazardous object from the captured images is achieved by running object recognition algorithms in the processor 151. in the case of detecting a fire, the detection problem is simplified by detecting a large number of very bright pixels on a captured image. See U.S. Pat. No. 7,542,585B2 for a related algorithm. In case of identifying the known felon, a facial recognition algorithm, e.g., the one disclosed in U.S. Pat. No. 7,643,671B2, may be used. In the case of a pre-determined person known to the user. An image of the person of concern could be placed within the software of the mobile computing device. The software could then be used to configure the personal security device to monitor the scene for that individual. For example, a stalker, an ex-lover etc. Many attackers of women being persons the woman is familiar with. Alternatively the personal security apparatus could be placed into a mode whereby it takes an image of a person of concern, or records a certain sound (for example, a key word, or a siren and the like), or detects a condition through the scene monitor, adding this to its internal memory as a scenario to start an emergency condition if they were to come into range of the sensors.

Apart from the camera 121. other sensors may be used to sense the ambient environment. Furthermore, pluralities of scene data respectively generated from these sensors and the camera 121 may be individually and independently used to identify occurrence of the emergency condition. The processor 151 may also be configured to select scene data only generated from a subset of all sensors in the apparatus 100 for identifying occurrence of the emergency condition.

In some embodiments, the scene monitor 110 is installed with a microphone 122, or a plurality of microphones, for capturing audio signals originated from the ambient environment. As a consequence, the scene data include the captured audio signals. Optionally, the processor 151 is configured to process the captured audio signals to determine whether a predetermined danger-indicative sound segment is present in the ambient environment in order to detect occurrence of the emergency condition. If the predetermined danger-indicative sound segment is determined to be present, the emergency condition is identified, thereby at least causing a transmission of the first plurality of scene data that is already held in the Mobile computing device's memory to be automatically initiated without a need for the user to initiate the transmission. Examples of danger-indicative sound segments include a gunshot an explosion, a scream, a siren, and one or more predetermined spoken words related to danger. Such spoken words may be "gun," "help" and "I'm shot." A second plurality of data is then produced by the personal safety apparatus and sent via the mobile computing device to the remote server 170 to be automatically initiated without a need for the user to initiate the transmission. While both wearable apparatus and Mobile computing device retain a copy of the data at least until it is confirmed to have been safely stored on the remote server.

In some embodiments, the scene monitor 110 is installed with a hazardous-gas sensor 123, or a plurality of hazardous-gas sensors, for measuring a concentration of a predetermined hazardous gas to yield hazardous-gas concentration data. Typical examples of hazardous gas include carbon monoxide and hydrogen cyanide. Optionally, the processor 151 is configured to process the hazardous-gas concentration data to detect occurrence of the emergency condition. If the hazardous-gas concentration data reveals that the concentration of the predetermined hazardous gas exceeds a certain predetermined concentration, the emergency condition is identified, thereby at east causing a transmission of the first plurality of scene data already held in the mobile computing device's memory to be transmitted to the Secure Server and for the second plurality of data to be produced by the personal safety apparatus and sent via the mobile computing device to the remote server 170 to be automatically initiated without a need for the user to initiate the transmission. While both personal safety apparatus and Mobile computing device retain a copy of the data at least until it is confirmed to have been safely stored on the remote server.

In some embodiments, the scene monitor 110 is installed with a PM measurement sensor 124, or a plurality of PM measurement sensors, for measuring a concentration of PM in the ambient environment to yield PM concentration data. Portable PM measurement sensors are available in the art, e.g., the ones disclosed in US 2009/0056416A1 and U.S. Pat. No. 9,995,667B2. Optionally, the processor 151 is configured to process the PM concentration data to detect occurrence of the emergency condition. If the PM concentration data reveals that the concentration of the PM exceeds a certain predetermined concentration, the emergency condition is identified, thereby at least causing a transmission of the first plurality of scene data already held in the mobile computing device's memory to be transmitted to the Secure Server and for the second plurality of data to be produced by the personal safety apparatus and sent via the mobile computing device to the remote server 170 to be automatically initiated without a need for the user to initiate the transmission. While both personal safety apparatus and Mobile computing device retain a copy of the data at least until it is confirmed to have been safely stored on the remote server.

In some embodiments, the scene monitor 110 is installed with an ionizing radiation sensor 125, or a plurality of ionizing radiation sensors, for measuring radiation power of ionizing radiation to yield radiation-power data. The ionizing radiation is usually emitted by a radioactive substance, causing, danger to the user. Portable ionizing radiation sensors are available in the art, e.g., the ones disclosed U.S. Pat. No. 8,466,425B2 and WO 2015/026261A1, Optionally, the processor 151 is configured to process the radiation-power data to detect occurrence of the emergency condition. If the radiation-power data reveals that the level of measured ionizing radiation exceeds a certain predetermined level.

the emergency condition is identified, thereby at least causing a transmission of the first plurality of scene data already held in the mobile computing device's memory to be transmitted to the Secure Server and for the second plurality of data to be produced by the personal safety apparatus and sent via the mobile computing device to the remote server 170 to be automatically initiated without a need for the user to initiate the transmission. While both personal safety apparatus and Mobile computing device retain a copy of the data at least until it is confirmed to have been safely stored on the remote server.

Other sensors that may be useful to be installed in the scene monitor 110 include an IR camera and a UV sensor. The IR camera is especially useful for capturing a scene of the ambient environment at night. The IR camera can also be used for thermal imaging. Thermal imaging may be advantageously used for identifying fire, or identifying nearby people who have a fever. The UV sensor enables the apparatus 100 to raise alarm in case of high UV radiation level.

In some embodiments the mobile computing device might also use its sensors or sensors independent of it but connected to it as a means of detecting an emergency event. As the two devices are connected, it is conceivable that they might work together in detecting an emergency event or compare scene data to avoid false activation.

Once an emergency condition is recognized by the mobile computing device, it could inform the personal security apparatus of the emergency event and instruct it to begin the transmission of the second plurality of scene data. For example, the mobile computing device having access to window sensors in a building, or the front door sensor in a person's home. On being informed that a window/door had been opened without permission it could then initiate an emergency response (which might include an alarm to wake the user) and begin gathering a second plurality of scene data as well as instructing the personal security device to do the same.

Apart from using various sensors to detect occurrence of the emergency condition, it is also possible to detect its occurrence by checking if the scene data are properly received during normal operation. An unexpected stop of transmission of the scene data from the scene monitor 110 to the main controller 140 is indicative to possible happening of adverse events, such as a robber robbing the user and trying to destroy the scene monitor 110. In some embodiments, the processor 151 is configured to monitor transmission of the scene data from the scene monitor 110 to the main controller 140, and to detect an unexpected stop of scene-data transmission, in case the unexpected stop is detected, the processor 151 identifies that the emergency condition has occurred. It triggers an automatic transmission of the first and if available the second plurality of scene data to the mobile computing device and/or to the remote server 170 without a need for the user to initiate this transmission.

In practical use of the apparatus 100, the user wears the apparatus 100 on the user's garment. The apparatus is positioned outside the garment so as to sense the ambient environment. Preferably, the apparatus has a casing that is waterproof, for example, a waterproof casing made of hard plastic. Although in another embodiment the apparatus could be built into a pair of glasses, an earpiece, a hat or some other item that is worn by the user. In the case of being used with a bicycle or motorcycle, an attachment might be used to affix the device to the handlebars or some other position in proximity to the user providing a clear view. On the other hand, the mobile computing device (smartphone) is usually concealed inside the garment or attached to a lanyard, secured in a pocket or other means of securing the device to the person's body or belongings in order to resist a malicious person from grabbing mobile computing device with the intent to damage it or stop its ability to record and/transmit.

In one embodiment the apparatus 100 further may comprise of a cable 130 or a IC chip connection, connecting the scene monitor 110 and the main controller 140 for at least enabling the scene monitor 110 and the main controller 140 to communicate, while being separate, allowing the main controller to be hidden from view underclothing, in a bag or pocket and the like.

In some embodiments, the main controller 140 further comprises a battery holder 156 for accommodating a battery 155. The battery 155 is a replaceable or a rechargeable battery. The cable 130 is configured to transmit electrical power from the battery 155 to the scene monitor 110 for powering the scene monitor 110. In some embodiments, the battery 155 is a built-in battery and is rechargeable. The battery 155 is installed inside the main controller 140 for powering the apparatus 100. Further, the apparatus battery can also be used to reverse the mobile computing device or vice versa.

As the battery 155 could be a coin shaped LI-Ion battery to reduce the size and weight of the apparatus. SO, it can be easily carried by the user. The apparatus being realized as a lightweight small-size unit comfortable for the user to wear on the garment.

For the convenience to the user, preferably the apparatus 100 further comprises an attachment device 112 attached to the apparatus for detachably attaching the scene monitor HO to the garment of the user or in close proximity to the use, for example on the handlebars of a bicycle. The attachment device 112 may be a simple clip to clothing or a bag, a lanyard around the neck, or snap-attached on an armband, hag, a leg band, a head band, a cap, a chest strap or other wearable article carriers. The attachment device 112 may include a Velcro band, a magnetic fastener or other snap attachment accessories.

It is sometimes useful to record locations of the user when he or she travels. In some embodiments, the scene monitor 110 or the main controller 140 is installed with a GPS tracking unit 126 for identifying a geographical location of the apparatus 100 to yield location data. The scene data further includes the location data. In other embodiments the GPS data is collected from the Mobile computing device either when the device is in an emergency condition or simply when the device is operational. Other associated sensor separate to but connected to the system described might also be used.

The mobile computing device may also have access to other data that could improve the potential investigation by authorities. For example, a record of what Bluetooth devices or other devices it is capable of detecting were close by at the time (suggesting what people were present at the incident), cell tower strength, a recording from its own camera and/or microphone and the like. This data can also be uploaded to the secure server in the event of an emergency condition. The intent being that the Mobile computing device has the ability to “enhance” or “add to” (via its own sensors and capabilities) the scene data produced by the Personal Security apparatus.

In general, the main controller 140 further comprises the memory 153 for storing the scene data received from the scene monitor 110, The processor 151 is configured to store the scene data in the memory 153 and the memory of the mobile computing device. The memory 153 may be a volatile memory (such as a random-access memory module) or a non-volatile memory (such as a solid-state storage or a magnetic disk). The memory may also be some form of “buffering” approach saving the data over a predetermined period of time. Either way, the intent is to use the “memory” to be able to record what has and is happening to the user. Those familiar with the art may be able to use hardware and or software to their advantage to bring about the same outcome. Whether volatile, non-volatile or some other form of memory used can be determined by those skilled in the art according to the situation under consideration.

The processor 151 may be implemented as one single processing element or a group of processing elements networked together. A processing element may be a general-purpose processor, a digital signal processor, a specialized processor (e.g., a processor specialized for image processing), a microcontroller, a programmable logic device, a field programmable gate array, or some other form of device designed to execute the required tasks etc. The processor 151 is configured or programmed according to the teachings of the present disclosure. Computer instructions or software codes running in the processor 151 can readily, be prepared by practitioners skilled in the software or electronic art based on the teachings of the present disclosure.

The transceiver 152 is configured to support one or more communication protocols for enabling the apparatus 100 to communicate with an external device, such as the remote server 170. Usually, the remote server 170 is located in a computing cloud 175 and is addressable through the Internet. In some embodiments, the transceiver 152 is configured to at least support one or more terrestrial mobile communication protocols (e.g., LTE 5G mobile communication standard, etc.). Wireless connectivity between the remote server 170 and the apparatus 100 is provided through a terrestrial mobile-communication link 177 and the computing cloud 175. In some embodiments, the transceiver 152 is configured to at least support one or more short-range communication protocols (such as BLE protocol, etc.). As an example, for illustration, the apparatus 100 is wirelessly communicable with a mobile computing device 172 on a wireless channel 178 by using \'Vi-Fi. The mobile computing device 172, such as a smartphone, is usually accessible to the computing cloud 175. Wireless connectivity between the apparatus 100 and the remote server 170 is established via the wireless channel 178 and the mobile computing device 172. In the case of a laptop computer, being the mobile computing device, a wired Lan or landline of some description may also offer the Mobile computing device access to the internee and the secure server.

FIG. 2 illustrates the personal safety apparatus 100 having a permanent wireless connection to a mobile computing device, in accordance with one of the embodiments of the present invention, and a mobile computing device can take many forms from Smartphone to delivery truck.

These different forms of the mobile computing devices are those having wireless communication connection open or available to connect with the personal security apparatus. Further, the personal safety apparatus can be attached to helmet, headgear, Bicycle or to user’s clothing.

The purpose of the personal safety apparatus is to remain closed or attached to the user.

FIG. 3. illustrates the personal safety apparatus recording in a pre-determined loop and transmitting a copy to a mobile computing device, in accordance with one of the embodiments of the present invention.

In case of no emergency, the regular ambient data in the form of images or videos are stored in the apparatus and to the mobile computing device. No data is sent to server for safe keeping. Two local copies are stored, one in the apparatus and the second in the mobile computing device.

However, these copies can be deleted by the user or the administrator manually or automatically after a pre-determined period of time.

FIG. 4. illustrates the mobile computing device in an emergency condition sending the first and second pluralities of data to the secure server, in accordance with one of the embodiments of the present invention. This further illustrates a copy of the first and second pluralities of data is also stored on the mobile computing device and in the personal security apparatus. The first and second plurality of data is then sent to secure server using the mobile computing device. The first and second plurality of data is only sent to the secure server in the event of an emergency. The first copy of the first plurality of data is FP1 and first copy of second plurality of data is SP1. It is also stored within the personal security apparatus.

The second copy of the first plurality of data is FP2 and second copy of second plurality of data is SP2 It is stored within the mobile computing device.

Third copy of first plurality of data is FP3 and third copy of second plurality of data is SP3. It is stored within the secure server.

The first and second plurality of data stored in the secured server can only be removed or accessed with authentication or authority credentials.

The point here to note is that the personal security apparatus communicates with the mobile computing device and the mobile computing device communicates with the secure server. There can or cannot be a direct communication between personal safety apparatus and the secure server.

FIG. 5. illustrates the personal safety apparatus with the mobile computing device and a cloud server, in accordance with one of the embodiments of the present invention.

Once the first and/or second plurality of data is received by the secure server, a notification is sent to the mobile computing device and to the personal security apparatus. The user may or may not choose to erase or wipe or clean manually by the user or automatically after a predetermined period of time or on reaching home or a specific destination. This is at the user's discretion. The home and destination are pre-determined, which can also be determined by the system, when the mobile computing device and/or the apparatus are in range of known wireless or location.

The data from the mobile computing device and the personal security apparatus can be removed using a mobile application or a desktop application or software or an interface.

FIG. 6. Illustrates a flow chart of the method of communication first and second plurality of data, in accordance with one of the embodiments of the present invention.

At Step 610: The personal security apparatus starts loop recording of the first plurality of data and stores in the apparatus.

At Step 620: The personal security apparatus send loop recording to the mobile computing device to a mobile computing device constantly or on regular basis. The mobile computing device store a second copy of the first plurality of data to the memory of the mobile computing device.

At Step 630: A decision to determine the occurrence of the emergency condition.

At Step 640: If no, resume normal operation and continue loop recording.

At Step 650: If yes, it means an emergency situation has occurred. Mobile computing device sends a copy of the first plurality of data to a secure server.

At Step 660: In case of emergency, the personal security device sends a second plurality of data to secure server via the mobile computing device.

At Step 670: Mobile computing device also stores a copy of second plurality of data to the own storage.

At Step 680: The system checks if the first and second plurality of data is successfully stored to the secure server.

At Step 684, If the first and second plurality of data is successfully stored, the system informs the mobile computing device and the personal safety apparatus of the same.

At Step 688, the memory of the personal safety apparatus and the mobile computing device can be erased or wiped or clean manually by the user or automatically after a predetermined period of time or on reaching home or destination. The home and destination are pre-determined, which can also be determined by the system, when the mobile computing device and/or the apparatus are in range of known wireless or location.

At 690: In case the data is not successfully uploaded to the secure server, the system continually attempts to successfully upload to the secure server. Keeping the copies of first and second plurality of data in the memory of mobile computing device and the personal security apparatus.

It is desirable that the user can use a smartphone, smartwatch, laptop or a tablet computer to send configuration commands to the apparatus 100. Preferably, the processor 151 is configured to configure the transceiver 152 to communicate with an external mobile computing device (such as the mobile computing device 172) for receiving commands therefrom, and to execute the received commands. Commands from the smartphone or tablet may be provided using a short-range wireless protocol, e.g., Bluetooth, or configured over the air, via hotspot or a mobile network connection and a cloud service. This would simplify the design and potentially reduce the cost of the personal safety apparatus, allowing the control and configuration to be driven via a smartphone app or some other user interface present on the mobile computing device removing a need for a complicated interface on the Personal Security Apparatus itself.

The main controller 140 may or may not be installed with a display screen (not shown in FIG. 1) for providing a user interface with the user. The main controller may or may not be installed with a keypad, either physical or digital in order to allow information entry and configuration of the personal safety apparatus.

The main controller 140 or the scene monitor 110 may be installed with an emergency button 162 for enabling the user to manually inform the processor 151 that an emergency condition has occurred.

For user convenience, the apparatus 100 may, be installed with a power button 163 or a virtual power button on the mobile computing device interface for enabling the user to manually switch on and off the apparatus NO. However, the presence of the power button 163 provides an opportunity to an attacker who attacks the user to switch off the apparatus 100 in order to prevent the scene monitor HO from sensing the ambient environment and/or to prevent the main controller 140 from relaying the scene data to the remote server 170 for safe-keeping. As a countermeasure, it is preferable and advantageous that the power button 163 is inactivated after occurrence of the emergency condition is detected. In particular, the processor 151 is configured such that when occurrence of the emergency condition is detected, the power button 163 is inactivated so as to disable switching off the apparatus 100. Due to the importance of the mobile computing device in providing connection to the remote server, it is also advantageous if the mobile computing device also locks itself down during an emergency condition. For a Smartphone this might be a lock screen requiring an additional pass code either for the main lock screen or ideally an additional level of security with a lock screen within the app or user interface of the device specific to controlling or configuring the personal security apparatus. Some other means of identification other than a passcode might be used. For example: Facial recognition, fingerprint or some other biometric approach to prevent a would-be attacker getting hold of the mobile computing device and turning it off.

Preferably, the temporary inactivation of the power button 163 is maintained at least until the processor 151 receives a message from the remote server 170 or the mobile computing device that the remote server 170 has successfully received the first plurality of scene data. It thereby hinders the attacker from forcibly stopping the transmission of the first plurality of scene data to the remote server 170. The temporary inactivation of the power button 163 may be maintained for a longer duration such that the scene monitor 110 continues to sense the ambient environment and the scene data obtained after the emergency condition is detected, i.e., the second plurality of scene data, are sent to the remote server 170.

To further illustrate the use of the disclosed mobile personal-safety apparatus, a practical realization of the apparatus 100 and a supporting platform for supporting a user who wears the apparatus 100 is described as follows.

Remote Data Storage

The scene data collected by the scene monitor 110 are to be stored outside of the apparatus 100 to mitigate risks of on-site or in-situ data destruction by a hostile party after an emergency or adverse incident has occurred. An adverse situation or incident may include bodily attacks, robbery, accident, accidents, natural disasters or other distress events. The collected scene data may be stored in the mobile computing device and to remote server 170 with a designated data storage account identified by an account name or identification. The designated account, preferably is a cloud-based account and the data, storage space is preferably cloud-based and is operated by a service provider. The service provider rnay operate a personal security service platform to provide customized services to registered users to provide personal security support. The platform may include predefined schemes or measures to react or counteract upon receipt of signals representing an emergency situation such as personal danger of a registered user. The platform may communicate continuously with the apparatus 100 and monitor signals originating from the apparatus 100 when the apparatus 100 is in a protection mode. When the platform is in receipt of signals from the apparatus 100 signifying occurrence of an emergency situation, the platform may react, or counteract by reporting to the police or other responsible authorities and/or to contact, with a person or persons pre-registered by the account user. For example, the person may be a next-of-kin or a family member, or trusted friend. The user may allow different levels of access to the data depending on the person. For example, friends may see only location information. Police may see both video and location information. It will be at the user's discretion and controlled by selecting option in the user's server storage account. The platform on execution of stored instructions may also excerpt or extract information obtained from the scene data and provide the excerpted or extracted information to support rescue operations or to provide assistance. To have an external data storage account for access to the remote server 170, the user would need to set up a designated storage account with the platform when activating the apparatus 100 for the first time. To enable the platform to make contact with a desirable person in case of an emergency, the user when setting up the account or subsequently would need to input contact information of the contact person.

To mitigate risks of data destruction by a hostile party during or after an emergency or adverse incident has occurred, it would be possible to set up in the user's data storage account the option for files transmitted to the mobile computing device and/or remote server 170 under Emergency Mode circumstances for other modes at user's discretion) to not be deleted even by the user for a period of time, for example, 72 hr. It stops the hostile party forcing the victim to give up any password protection set up in the system and deleting the files via web interface or mobile application. During this lock-down period, friends and family or the emergency services that have been set up in the system to access such files are able to view the data and act accordingly.

Modes of Operation

The mobile personal-safety apparatus 100 is operable in a plurality of operational modes and the main controller 140 is configured to operate in the plurality of operational modes on execution of stored instructions forming the "App".

Basic Mode (Eyes on)

Regardless of the instantaneous mode of operation in execution, the main controller 140 of the apparatus 100 during execution of pre-stored instructions of application software may always include an operation mode that is identified as the basic mode. In the basic mode, the main controller 140 is to operate to continuously record scene data, for example take video or a series of snapshots and audio recording, temperature measurements and the like and store the recordings in a loop of a predetermined duration in the memory 153 as a local storage such that recordings older than the predetermined duration are overwritten first by new recordings. The duration may, for example, be between 30 seconds and 5 minutes, between 5 and 1.5 minutes, or other durations selected or set by the user. The main controller 140 in order to conserve power in the basic mode, has the option to record at a reduced power setting by reducing the resolution of the images captured, reducing the frame rate of the video capture, turning off certain, sensors, or any combination thereof, either at the discretion of the user, or potentially programmed into the operating system of the main controller 140.

For example, normal operation may be at 10 frames per second. When the device gets down to 20% battery or less, Basic mode reduces the frame rate to 5 frames per second or less in order to assist in extending life of the battery 155. At the same time the device has the ability to transmit the same loop recording to the mobile computing device so that a copy of the loop recording is held on the mobile computing device as well as the wearable apparatus.

Emergency Mode (Protect)

The main controller 140 may be instructed to enter into Emergency mode due to an adverse event, for example, one or more of the following incidents:

- the user manually triggers an emergency trigger.
- the scene monitor HO experiencing an abrupt or a violent movement signifying that the scene monitor 110 is being snatched off the user or the user is being physically attacked.
- an unexpected stop of transmission of scene data from the scene monitor 110 to the main controller 140.

the user experiencing a sudden fall, or accident involving violent movement.

the scene monitor 110 experiencing/sensing recognizably threatening images, such as a fire, a weapon, specific person preprogrammed by the user or a known felon.

the scene monitor 110 experiencing/sensing audible warnings in the environment, for example, a gunshot, a scream, a siren or key words spoken to trigger and emergency event.

the scene monitor 110 experiencing/sensing certain hazardous elements in the ambient environment, such as radiation, certain particulates in the air, gas emissions, etc.

The scene monitor recognizes aggressive behavior or motions by a person in view of the camera.

If the person is expecting to be alone at any time, then recognizing a person entering the environment might also be seen as a threat. For example, a person entering another per home or bedroom.

Once successfully stored to the Internet or the external location, the memory 153 can potentially be wiped in order to save memory space.

Any friends, family or emergency services (emergency contacts) selected by the user are then notified of an event via, e.g., email, SMS or other recognized means of communication.

A web link is provided to the emergency contacts allowing them to access the data to view and react to. These files may only be viewed and not tampered with by the emergency contacts to maintain the integrity of "the evidence".

These files cannot be deleted for a time period in order to provide additional security to the user.

Monitoring Mode: Sentry Mode

Many—women are attacked in their own homes or dorm room. Sentry mode is intended to look for people entering the room. If the main controller is configured to anticipate only 1 or 2 people in the room, an emergency condition will be activated if a third person enters the room.

Remember Mode

Sometimes a person may not feel threatened but would like to remember a certain incident. For example, a member of staff being rude or abusive to them. By pressing a button, offering a verbal command or some other predefined trigger, the main controller lock down the previous data recorded over the predetermined period of time and continue recording for a further pre-determined period of time. Saving the first plurality of data and the second plurality of data, to the Mobile computing device and the secure server. This data, might be tagged differently in the user interface. For example: Remember mode videos.

Other Modes

The example modes are just examples to illustrate example operation of the apparatus 100. Other modes can be devised from time to time without loss of generality.

Adverse Situations and Emergency Events

The main controller 140 on execution of pre-stored instructions of the application software is to be in continuous data communication with the scene monitor 110 to receive real-time scene data. The scene data are typically transmitted in real time as electronic signals, but can be transmitted as optical, infra-red, sonic, ultra-sonic or other signals suitable for data communications without loss of generality. The main controller 140 on executing pre-stored instructions is to process and analyze the received scene data and to determine whether the received scene data correspond to an adverse situation or a non-adverse situation. The instructions of the application software are pre-stored in the memory 153 of the main controller 140 for subsequent retrieval and execution by the main controller 140 to facilitate personal safety monitoring.

If the main controller 140 after having analyzed the received scene data comes to a determination that an adverse situation is justified, or if there is a need to record evidence and store safely in the cloud 175 and/or to inform external assistance or external intervention, the main controller 140 is to generate and to transmit a distress report automatically to an external destination by machine operation. The aforementioned external destination is geographically remote from the user and the distress report may be transmitted by the main controller 140 through the transceiver 152 and by using the Internet or other wide area network, such as a public Wi-Fi available at the scene. Alternatively, via the connectivity to the internet provide via the Mobile computing device. The apparatus 100 may be pre-set to send the distress report to a report center of a service provider. The service provider may be a platform operated by a dedicated distress relief agency, such as a law-enforcement operated call center, or by a private security enterprise operating on-line relief facilities. A distress report may comprise a distress signal signifying a safety-threatening event has occurred, a distress message comprising critical information and optionally a copy of scene data. Critical information may include a time stamp indicating the time when the distress report was sent, location of the scene, and severity of distress. The severity of distress may be classified into a plurality of distress levels and/or a plurality of distress natures according to a pre-established system to indicate the urgency of distress relief required. For example, the severity of distress in descending order of relief urgency required may be classified into:

(1) life-threatening (immediate relief required).
(2) life-threatening (relief required).
(3) safety-threatening (immediate relief required).
(4) safety-threatening (relief required); and
(5) attention required (lowest priority).

The critical information and the scene data may be sent as attachments to the distress report. It is possible that the critical information and the scene data may be sent following a distress signal of the distress report to alert the platform. The platform may be a manually operated platform or a machine-operated platform pre-trained (for example, by using AI training) to handle distress reports.

The distress report may include a protected copy of recording or clipped recording of an attack where an attack is detected or apparent. The platform on responding to the distress report may seek to establish communication with the user to seek confirmation whether the distress signal is real or false. The platform may take over control of the apparatus 100 remotely to provide emergency intervention to deter an attacker, to comfort the victim and/or to monitor the scene pending arrival of distress relief.

The main controller 140 on execution of the pre-stored instructions of the application software is capable of identifying an adverse situation based on received scene data and sending a distress report to the platform by machine operations. To facilitate identification of an adverse situation with reference to the captured scene data by machine operations, the application software includes instructions which on execution by the main controller 140 are to analyze contents of the scene data to identify whether any safety-threatening scenes constituting an adverse situation or adverse situations are embedded in the scene data, and/or to extract the safety-threatening scenes for sending off to the remote destination for distress relief and/or for preservation of evidence. The main controller 140 may extract pertinent scene data for summary assessment by the platform.

To facilitate identification of an adverse situation with reference to the captured scene data by machine operations the application software may include instructions whiCh on execution by the main controller 140 are to analyze image contents of the scene data and to identify distress scene images indicating safety threats. Example of distress scene images include images of weapons, body parts, fierce facial expressions, bloody scenes, fighting scenes, fire, etc.

The instructions may be formulated based on motion and/or sound detection and analyzing algorithms adapted for determining whether the scene data contain an adverse situation. The main controller 140 may be equipped with AI to recognize an adverse situation or to determine whether a situation is adverse or non-adverse.

In order for the apparatus 100 to make machine-based decisions on whether a set of received scene data corresponds to occurrence of an adverse situation, conditions to qualify a situation as an adverse situation are to be predetermined and preset in the stored instructions.

In some examples, scene situations are to be broadly classified as an adverse situation or a non-adverse situation. Scene situations may be classified as adverse, non-adverse, or neutral. An adverse situation means an unpleasant situation. A non-adverse situation means a situation in which the user is performing activities as contemplated or scheduled and without negative indications. A neutral situation is one that is intermediate between the adverse and non-adverse situations, and the uses does not require external assistance or intervention.

Adverse situations may be classified into a plurality of distress levels according to the degree of severity or gravity so that appropriate levels of relief actions or measures can be implemented. For example, an adverse situation may be classified as personal-safety-threatening or non-personal-safety-threatening. A personal safety-threatening situation may be further classified as life-threatening or non-life threatening. A lite-threatening adverse situation may be assigned with the highest priority or gravity level and the most urgent responses and external intervention are to be provided. The life-threatening adverse situation may further be classified as an imminently life-threatening and non-imminently life-threatening. The non-life-threatening safety-threatening adverse situation may be assigned with a priority lower than the highest priority but higher than non-safety threatening adverse situation. The non-life threatening but safety situation may further be classified as a significant or non-significant event. For example, personal injuries with no imminent danger to life is classified as a significant event, while an accidental fall with the user resuming his or her pre-fall situation within a predetermined time limit is classified as a non-significant event.

The platform may generate an automated distress report to an external destination by machine operated data communication upon detection of a safety-threatening adverse situation. The external destination may be a call center of law enforcement agencies, rescue operations and/or personal contacts of the user. A protected copy of the captured scene data may be attached with the distress report to mitigate risks of adverse tampering.

Listed below are some examples of adverse situations:

the user being attacked.

the user suffering an accidental trip or fall.

an abnormal or unexpected change in velocity of the user.

the user anticipating or foreseeing threats to personal safety.

the scene monitor 110 being disconnected during operations and the connection not resuming within a prescribed duration.

the scene monitor IN experiencing/sensing recognizably threatening images such as a fire a weapon, a known felon, etc.

the scene monitor 110 experiencing/sensing audible warnings in the ambient environment, for example, a gunshot, a scream, a siren or be words spoken to trigger an emergency event; and the scene monitor 110 experiencing/sensing certain hazardous elements in the ambient environment, such as radiation, certain particulates in the air, gas emissions, etc.

Proximity of a person or more persons being in view of the camera than predetermined as safe.

An attack can be a physical attack or a verbal attack. The physical attack may involve bodily assault that may result in bodily harm and/or injuries. The verbal attack in itself typically involves verbal abuses but may escalate to physical violence and bodily harm and/or injuries.

In other to detect and determine whether the user is currently suffering from the physical attack, for example, being punched or hit, the scene monitor 110 may be equipped with a 3-axis accelerometer and/or a barometer (as the motion sensor 160), and the main controller 140 is to make the determination from the captured motion data, which are part of the scene data. If a fall resembling a free fall, a violent fall or a violent movement of the user is detected, the adverse situation may correspond to a physical attack on the user or an accidental fall of the user. To distinguish between the physical attack and the accidental fall, the main controller 140 on executing stored instructions may proceed further to analyze the captured scene data to determine whether there is an attacker in the vicinity. If there is no attacker identified in the vicinity, the adverse situation may be classified as non-attack, and a non-attack procedure may be invoked by the main controller 140. If an attacker in the vicinity is identified, an attack procedure may be invoked by the main controller 140. If the user is responsive to communication requests of the platform after a falling incident is detected, indicating that the user is conscious, the platform is to continue communication with the user until a state of distress has been cleared. However, if the user is non-responsive to communication requests of the platform after a falling incident is detected, indicating that the user may be unconscious or fettered, the platform is to activate a life-threatening intervention procedure.

In order to determine whether an attacker is present, the application software may include a set of attacker identification instructions for analyzing captured scene data. The attacker identification instructions are to facilitate the main controller 140 to determine whether an attacker is present based on the captured scene data. The attacker identification instructions may include facial recognition instructions to identify and determine facial features and expressions of a person or animal present in the immediate vicinity of the user with reference to the video or image portions of the captured scene data. The captured scene data may be those recorded immediately before the attack, during the attack and/or after the attack if no facial feature of an attacker is detected immediately after an attack, the platform may remotely operate the scene monitor 110 to search for possible attackers, for example, by rotating the camera 121 in all possible orientations to search for possible attacker.

To further facilitate determination of whether an attacker is present in the vicinity, the platform may make reference to sound recordings taken at the scene with reference to the audio portion of the captured scene data. For example, the operators of the platform may listen to the audio portion of the captured scene data before, during and after a falling incident to determine whether there is/was any verbal exchange indicative of abuse or violence.

The attacker identification instructions may include sound or speech recognition instructions that are to operate automatically to identify and determine whether the speech features are indicative of possible abuse and/or violence.

The attacker identification instructions may include instructions to facilitate both facial recognition and sound/voice recognition to facilitate more efficient and reliable situation determination.

A sudden, abrupt or violent change in velocity of the user while performing activities having a stipulated range of speed may be indicative of an adverse situation such as a physical attack, a car crash or other types of accidents including traffic and non-traffic accidents. The user may be inside or outside of a vehicle while involved in a traffic accident, which causes a sudden change in velocity. Whether a change in velocity of the user is an abrupt, sudden or violent change in velocity is determined with reference to the activities being undertaken. For example, if the activities being undertaken by the user are within a range of speeds or have a range of changes in speeds, a speed or a speed change exceeding a safety threshold would be classified as an abrupt or violent change. For example, if the user has been jogging at a speed of between 5 km to 10 km per hour, a sudden increase in speed to, say, 25 km is likely to indicate an adverse situation requiring external attention. If the sudden increase in speed is followed by a sudden stop, the chance that an adverse situation has occurred is very high.

The main controller 140 may include settings options for the user to input the mode of activities being taken. The setting options may include other activity parameters or metrics. Example modes of activities may include walking, jogging, running, sprinting, cycling, hiking, skiing, swimming, etc. The change in velocity may be an increase or a decrease in speed and/or a change in orientation. After the mode of activity has been set, the main controller 140 is to monitor the activity of the user and determine the average speed or velocity from time to time to set a reference to determine whether an abnormality has occurred.

The setting options of the main controller 140 may allow the user to preset a maximum value of speed. The setting options of the main controller 140 may allow the user to preset a maximum allowable rate of change of speed as a change threshold or a threshold value of change. If the maximum rate of change exceeds the change threshold, the main controller 140 generates a distress signal indicative of an adverse situation. The threshold value of change is a change of a threshold percentage within a prescribed duration. The prescribed duration is typically a very short duration of, say, within one to two seconds to correspond to occurrence of an adverse situation or mishap.

The application software may provide the user with an option to set a range of average speed, the maximum safety speed and/or the change threshold in percentage terms. The instructions may be AI-trained instructions to determine whether there is a sudden, abrupt or violent change in velocity.

When the main controller 140 has detected a sudden or abrupt change in velocity, followed by a total stop or a continuation of an exceedingly high speed, the safety procedure may be invoked by the main controller 140.

The application software may include instructions for detecting a series of movements and velocity changes over time so as to detect if the series of such movements and velocity changes is indicative to a non-normal behavior of the user. In case the non-normal behavior is detected, an emergency condition is triggered.

The application software may include sound recognition instructions. The main controller 140 upon execution of the sound recognition instructions would be able to identify audible signals indicative of hazards. Example audible signals indicative of hazards include fire alarms, buzzer sounds of emergency relief vehicles such as police cars, ambulance, fire trucks, etc. In general, the sound detection operation of the main controller 140 operates with other aspects of detection mechanism before deciding whether to generate and transmit distress signals to an external destination via the transceiver 152.

The application software may include pattern recognition instructions. The main controller 140 upon execution of the pattern recognition instructions would be able to identify scenes, items or article indicative of personal hazards. Gun rifle, meat cleaver, a hand gesture, etc., are examples of items or articles indicative of personal hazards. A scene of fire or explosion is an example of a scene indicative of personal hazards.

The application software may include hazardous environmental recognition instructions. The main controller 140 upon execution of the hazardous environmental element recognition instructions would be able to identify particulates in the environment at a level to be of personal hazard or to warn for its existence in the environment. Radiation, asbestos, illegal drugs, explosives, poisonous gas, etc. are examples of elements of personal hazards.

The application software may include a manually operable distress signal activator or generator. For example, a soft distress button (the soft distress button could be wirelessly connected to the main controller 140, providing remote control switch that could be stored in a pocket of the user) may be set on the main controller 140 or the scene monitor 110 such that the user can manually activate the main controller 140 to send a distress report to an external relief destination to invoke a life-threatening intervention procedure when danger or imminent attack is anticipated. (As one example, the soft distress button may be realized as the emergency button 162 on the main controller 140.) A soft distress button might also be a predetermined action via a smartwatch, connected to the personal security apparatus via Bluetooth or some other wireless means. The platform upon receipt of the manually triggered distress report may communicate with the user, or, optionally, remotely inspect the scene through remote control of the scene monitor 110 to evaluate the immediate risks level before establishing voice communication with the user. The application software may include a silent distress mode so that the exact location of the user can be hidden and not exposed to a hostile party due to audible signals coming out of the apparatus 100.

An unexpected physical or data disconnection between the scene monitor 110 and the main controller 140 may be classified as an adverse situation or a distress event. For example, if the scene monitor 110 is disconnected from the main controller 140 without warning, the main controller 140 would classify the disconnection as an adverse situation. To mitigate the risks of false alarms, a condition could be set (but does not necessarily need to be) to see if the connection is re-established within a predetermined time after disconnection, the fake alarm is to be removed and the apparatus 100 is reset to a non-distress state.

The main controller 140 may determine with reference to the captured scene data whether the scene monitor 110 has experienced an abrupt or violent movement immediately prior to the disconnection. For example, if the scene monitor 110 experiences an abrupt detachment corresponding to the scene monitor 110 being snatched off the user, the main controller 140 is to generate and transmit a life-threatening distress signal to the external destination to seek distress relief.

In use, the user is to wear the scene monitor 110 as depicted FIG. 7. The scene monitor 110 may be worn on the forehead 711, the shoulder 712, the arm 713, the chest 714 or the waist 715. The scene monitor 110 is then allowed to capture images forward of the user. The scene monitor 110 may be interchangeable depending on the user's needs, offering a broader field of view or installation with additional sensors. The scene monitor 110 may be worn on and protruding from the shoulder 712 or the forehead 711 for a 360-degree scene capture. In one embodiment, the main controller and scene monitor may be combined into one unit, in another embodiment the main controller 140 may be carried separately from the scene monitor 110. For example, the main controller 140 may be carried in a pocket, on a waist band, attached to a ladies' bra strap, around the neck via a lanyard or on an arm band distal from the scene monitor 110, or secured in a back-pack or bag. The intention is that the main controller 140 is out of view and is not as easily removed from the user as the scene monitor 110, which needs to be positioned at a location that is easily seen so that the scene monitor 110 can use the camera 121 and/or microphone 122 to "see" and "hear" what is taking place near the user. It offers greater protection to the data and provides additional time for the main controller 140 to transmit data to a secure remote location, if the user is under attack. The scene monitor 110 and the main controller 140 are connected, either by a cable 130, which is an insulated cable, to facilitate both data and power connection. In another embodiment they might be connected using a low power wireless connection such as Bluetooth or some other wireless means of communication. In addition, a control apparatus in an external destination may also take control of the scene monitor 110 remotely to conduct searches at the scene and to receive scene data that are obtained. The searches may be facilitated by changing the orientation and; or focus of the camera 121 of the scene monitor 110. The external destination may also converse with the user or persons within earshot of the apparatus 100 through a microphone and speaker arrangement. The user may also wear the scene monitor 110 to capture the scene data from rear side and/or lateral sides of the user. The scene monitor may be worn, say, on the forehead 711 the shoulder 712 and/or the waist 715 to facilitate capture of image with a 180-degree, 270-degree or 360-degree angular range. Multiple scene monitors may be worn providing different sensors. For example, a camera and a separate radiation sensor might be connected to the main controller 140.

Before the apparatus 100 is set into operational states, the user has to establish an account with the service platform for remote distress data storage as well as providing stress relief. When establishing the account, the user needs to provide his or her own personal particulars, contact information such as telephone numbers and email accounts. In addition, the user would need to provide the platform with personal particulars of an emergency contact, his or her mobile telephone number and/or email address for making emergency contacts.

After the account is registered and set up, the apparatus 100 is operational.

In example operations, the user wearing the apparatus 100 intends to venture into an area which the user is not familiar with and switch the apparatus 100 into the protection mode. While operating in the protection mode, the main controller 140 is to monitor motion of the user to record or learn the modus operandi of activity being undertaken, to record the geographical location or other metrics of the user, to continuously take scene data, and to transmit part or all of the captured scene data to the external destination or the remote server 170. The geographic location data may be obtained by means of GPS either locally on the apparatus 100 or via an associated smartphone (e.g., the mobile computing device 172) or with reference to identity of the instantaneous cell-phone station in connection with the main controller 140. In an example scenario, the user experiences an accidental fall and the accidental fail is detected by the main controller 140 on analyzing motion data received from the motion sensor 160. Upon detection of the accidental fall, the main controller 140 is to enter into a reporting mode and immediately stores the looped data to the main memory as well as ready to trigger a distress report. The user after the accidental fail resumes its pre-fail posture and activity within a pre-determined guarding period, say, 3 to 5 seconds, and the main controller 140 resets itself, removes the saved data from the memory 153 and places itself into a standby mode to continue operation, on the protection mode. Alternatively, the main controller 140 is to reset itself into a standby-mode if the user operates the main controller 140 to send a cancel instruction to indicate that the alarm was a false alarm. The cancel instruction may require a cancellation code. If the user fails to resume its pre-fall posture or activity or fails to send the cancel instruction within the guarding period, the main controller 140 is to send a distress report and/or all or part of the stored data from the time preceding the incident to the platform. In response, the platform is to attempt to establish communication with the user to confirm whether an adverse situation has occurred. Cancel an emergency event via a smartphone app. If no comforting communication is received from the user, the platform can invoke the life-threatening relief procedure.

In an example scenario, the user is in an area, feels a danger or anticipates an attack. The user triggers a manual emergency button 162 on the main controller 140 to invoke the life-threatening relief procedure. The data previously stored in a loop (length of loop being pre-determined in the device settings) are then saved to a permanent memory (in the memory 153) of the main controller 140 and then attempts though wireless connection to the Internet (Mobile computing device, Smartphone hotspot, Smartwatch, Laptop, tablet, or in potential commercial applications connected vehicle, Wi-Fi, or its own cellular connection, etc.) is sent to the cloud service for safe keeping. If no connection is available at the time, the main controller 140 can continue to record data and store the data in the memory 153 until such time as a connection is re-established. It will also store a copy of the data in the memory of the mobile computing device that is local to the user (Smartphone, Smartwatch. Vehicle, Laptop, Tablet and the like). When the Signal becomes available Then the main controller 140 uploads the stored data to the Internet for safe keeping.

The user may use the apparatus 100 with a smart phone (also referenced as 172 for simplicity). In example operations, the main controller 140 is to transmit scene data to the smartphone 172, which is to function as a hotspot, and the smartphone 172 is to configure the main controller 140 by means of, e.g., BLE protocol. Scene data are transmitted from the main controller 140 to the smartphone 172 and then to the computing cloud 175 as an external destination for data storage. The Smartphone will also retain a copy of the scene data in its own internal memory as an extra security measure to ensure the data is saved. When a platform needs to take over control of the scene monitor 110, the platform may send data and/or instructions to the smartphone 172, and the smartphone 172 is to send control commands to the scene monitor 110 to perform scene data collection. The platform may send data and/or instructions to the main controller 140. with the smartphone 172 functioning as a data communication hotspot. The smartphone 172 only performs the function of relaying messages between the main controller 140 and the computing cloud 175. However, the hotspot connection enabled by the smartphone 172 does allow the smartphone 172 and the main controller 140 to communicate together when needed, for example, sending instructions and settings, starting and stopping recording, reporting emergency events, etc.

While the present disclosure has been described with reference to example embodiments, example processes and example modes, the examples are for ease of understanding of the present disclosure and are not intended as limiting examples.

Definitions

As used herein, the term "scene monitor" may refer to a device that monitors an ambient environment of the user and transmits scene data.

As used herein, the term "processing" refers to executing instructions on a processor.

The term "first plurality of data" is used herein to refer to the most recently obtained data over a predetermined length of time.

As used herein, the term "predetermined length" refers to a period of time that is predetermined.

As used herein, the term "transceiver" may refer to any device that can perform wireless communication and sends a copy of the first plurality of data continuously/regularly to a separate secure server for future use.

As used herein, the term "wireless communication" refers to wireless communications over a network.

As used herein, the term "separate mobile computing device" refers to a separate personal safety apparatus wearable by a user in case of an attack or accident.

As used herein, the term "processor" may refer to a single processor or multiple processors.

As used herein, the term "emergency condition" refers to a situation in which the user is at risk of being attacked or injured.

The verb to "detect" (in the sense of detect, observe, find, discover, notice) can be replaced by discover or determine the existence, presence, or fact of.

As used herein, the term "emergency" may refer to a situation that arises in an emergency situation.

As used herein, the term "remote secure server for future use" refers to a secure server that can provide information to a remote server for future use even if the personal-safety apparatus or mobile computing device is subsequently tampered with or damaged.

As used herein, the term "memory" may refer to a physical memory unit of a mobile computing device, or memory "buffered" to temporarily stored in some manner.

As used herein, the term "ambient environment" may refer to an environment in which a user is likely to be at risk of being attacked or injured.

As used herein, the term "scene data" may refer to any information relating to an incident or situation.

As used herein, the term "event" may refer to an incident, such as an attack, fire, explosion, or any other type of hazard.

The term "turn" refers to any action taken by a personal safety apparatus, which may be in the hands of an individual, such as a police officer, firefighter, or other person.

As used herein, the term "first plurality" refers to a group of data most recently obtained over a predetermined length of time.

As used herein, the term "remote secure server" refers to a computer system that can store and transmit data for future use even if the personal safety apparatus or the mobile computing device is subsequently tampered with or damaged.

As used herein, the term "remote server" refers to a computer program that executes software on a local computer and stores it in memory.

To make the objectives, technical solutions, and advantages of this application clearer, the following clearly and completely describes the technical solutions in this application with reference to accompanying drawings in this application. Obviously, described embodiments are a part rather than all of embodiments of this application. All other embodiments obtained by a person of ordinary skill in the art based on embodiments of this application without creative efforts shall fall within the protection scope of this application.

The invention claimed is:

1. A personal-safety apparatus wearable by a user, comprising:
- a processor;
- a memory storing computer-readable instructions;
- a scene monitor comprising at least one of a camera or a microphone configured to capture scene data representing an ambient environment of the user;
- a transceiver configured to communicate wirelessly with a mobile computing device located within a predefined proximity of the personal-safety apparatus;

wherein the processor is configured to:
- control the scene monitor to continuously capture the scene data;
- generate a first data set comprising scene data captured during a predetermined time interval preceding detection of an emergency condition;
- transmit, via the transceiver, the first data set to the mobile computing device for storage in a memory of the mobile computing device;
- detect occurrence of an emergency condition based on at least one of:
  - the captured scene data, or
  - an input received from the user or the mobile computing device;
- in response to detecting the emergency condition:
  - transmit a notification signal to the mobile computing device indicating occurrence of the emergency condition; and
  - cause the mobile computing device to transmit the first data set to a remote server;
- generate a second data set comprising scene data captured after detection of the emergency condition; and
- transmit the second data set to the remote server via the mobile computing device;

wherein:

the personal-safety apparatus stores a first data log comprising the first data set;

the mobile computing device stores a second data log comprising the first data set; and the remote server stores a third data log comprising at least the first data;

and wherein:

the personal-safety apparatus is configured to transmit data to the remote server only through the mobile computing device, thereby reducing power consumption of the personal-safety apparatus.

2. The apparatus of claim 1, wherein the emergency condition is detected in response to activation of a user interface element comprising at least one of:

a physical button, or a graphical user interface control.

3. The apparatus of claim 1 wherein the processor is configured, at the discretion of the user, to delete at least a portion of the first data set or the second data set from the personal-safety apparatus or the mobile computing device after successful transmission to the remote server.

4. The apparatus of claim 1, wherein the processor is configured to generate the second data set in response to detecting the emergency condition and to transmit the second data set to the remote server via the mobile computing device.

5. The apparatus of claim 1, wherein the processor is further configured to store a copy of a second plurality of data in the memory of the mobile personal-safety apparatus for safekeeping at least until the first and/or second plurality of data has been successfully transmitted to the remote server.

6. The apparatus of claim 1, wherein the mobile computing device is further configured to store a copy of a second plurality of data to its own internal memory for safekeeping at least until the first and/or second plurality of data has been successfully transmitted to the remote server.

7. The apparatus of claim 1, wherein the mobile computing device is configured to detect the occurrence of an emergency condition adverse to the user and responsive to detecting the occurrence of an emergency condition, and in so doing to transmit the first plurality of data within its memory to the secure server and to inform the personal safety apparatus to transmit a second plurality of data to the remote server via the mobile computing device even if subsequently tampered with or damaged.

8. The apparatus of claim 1, wherein the mobile computing device is configured to be a smartphone, a smartwatch, a tablet, a laptop or some other form of handheld or worn computing device.

9. The apparatus of claim 1, wherein the mobile computing device is located or installed in a vehicle used by law enforcement, first responder, ambulance, military, commercial or private purposes for safe keeping a copy of the scene data local to the user reducing the need to transmit the data to a remote server.

10. The apparatus of claim 1 wherein the mobile computing device is configured to transmit configuration data or software updates to the personal-safety apparatus via the transceiver.

11. The apparatus of claim 1, wherein the personal safety apparatus comprises an artificial intelligence module to pre-determine the type of emergencies, on detection of new emergency situation, the processor self-learn and update a pre-defined list; and wherein the system is now evolving with the detection of new emergency situations.

12. The apparatus of claim 1, wherein the scene monitor comprises a camera for capturing images and/or video of the ambient environment, the scene data including the captured images or videos.

13. The apparatus of claim 1, wherein the processor is further configured to:

process the captured images to determine whether a predetermined object/person is present in the ambient environment to detect occurrence of the emergency condition; and responsive to detecting presence of the predetermined hazardous object/person, identify that the emergency condition has occurred, thereby causing the mobile personal-safety apparatus to inform the mobile computing device to start transmission of the first plurality of scene data and for mobile personal-safety apparatus to start a second plurality of scene data, transmitting that to the remote server via the mobile computing device to be automatically initiated without a need for the user to initiate the transmission.

14. The apparatus of claim 1, wherein the scene monitor comprises a microphone for capturing audio signals originated from the ambient environment, the scene data including the captured audio signals and further process the captured audio signals to determine whether a predetermined danger-indicative sound segment is present in the ambient environment to detect occurrence of the emergency condition; and responsive to detecting presence of the predetermined danger-indicative sound segment, identify that the emergency condition has occurred, thereby causing the mobile personal-safety apparatus to inform the mobile computing device to start transmission of the first plurality of scene data and second transmission of scene data to the remote server to be automatically initiated without a need for the user to initiate the transmission.

15. The apparatus of claim 1, wherein the mobile computing device may be a trusted device connected to the mobile personal-safety apparatus an apparatus using Wi-Fi, one or more terrestrial mobile communication protocols LTE, Bluetooth, Bluetooth Low Energy (BLE) or connection via hotspot for providing wireless connectivity.

16. The apparatus of claim 1, wherein the mobile computing device has a Global Position System (GPS) tracking unit either within itself or attached via cable or wireless means for identifying a location of the apparatus or the separate mobile computing device to yield location data and to transmit the location information to the remote server.

17. The apparatus of claim 1, wherein the main controller or the mobile computing device further comprises:

a power button or on-screen power button for enabling the user to manually switch on and off the apparatus or connection between the mobile device and apparatus to enter into power saving mode; and the processor is further configured to: responsive to detecting occurrence of the emergency condition, temporarily inactivate the power button to disable switching off the apparatus at least until the processor receives a message from the remote server that the remote server has successfully received the first and second plurality of scene data, thereby hindering an attacker who attacks the user from forcibly stopping transmission of the first-plurality of scene data to the remote server.

18. The apparatus of claim 1, wherein the mobile computing device can control the movement of the camera connected to the apparatus to capture any third-party incidents.

19. The apparatus of claim 1, wherein the processor of the mobile personal security apparatus is configured to identify the emergency situation before image processing on the faces of persons and checking them with a database of known criminals or terrorists; and on identification, a notification or alert is sent to the remote server and to the police authorities with the location of identification.

20. The apparatus of claim 1, whereby the associated mobile computing device is able to record its own scene data via its own scene monitors or scene monitors connected to it either physically or wirelessly.

* * * * *